US009610894B2

(12) United States Patent
Engel et al.

(10) Patent No.: US 9,610,894 B2
(45) Date of Patent: Apr. 4, 2017

(54) INTRUSION DETECTION SYSTEM AND METHODS THEREOF

(71) Applicants: George Engel, New York, NY (US); David Engel, Miami, FL (US)

(72) Inventors: George Engel, New York, NY (US); David Engel, Miami, FL (US)

( * ) Notice: Subject to any disclaimer, the term of this patent is extended or adjusted under 35 U.S.C. 154(b) by 0 days.

(21) Appl. No.: 14/800,555

(22) Filed: Jul. 15, 2015

(65) Prior Publication Data

US 2016/0039339 A1   Feb. 11, 2016

Related U.S. Application Data

(60) Provisional application No. 61/999,073, filed on Jul. 16, 2014.

(51) Int. Cl.
| | |
|---|---|
| *G08B 23/00* | (2006.01) |
| *B60Q 9/00* | (2006.01) |
| *B61L 23/04* | (2006.01) |
| *B61L 27/00* | (2006.01) |

(52) U.S. Cl.
CPC ............ *B60Q 9/008* (2013.01); *B61L 23/041* (2013.01); *B61L 27/0088* (2013.01)

(58) Field of Classification Search
CPC . B60T 1/005; B60T 1/067; B60T 7/16; G01S 13/04; G08B 13/00; G08B 13/1427; G08B 13/1436; G08B 13/19647; G08B 13/2417; G08B 13/18; G08B 13/181; H04K 2203/16; H04K 3/226; H04K 3/88; Y10T 70/06

USPC ...... 340/500, 540, 541, 600, 10.1, 552, 555, 340/556, 557, 5.1, 5.2, 5.21, 5.52, 5.53
See application file for complete search history.

(56) References Cited

U.S. PATENT DOCUMENTS

| | | | |
|---|---|---|---|
| 8,735,792 B2 * | 5/2014 | Hammes .............. | G06K 9/2027 250/205 |
| 9,321,470 B1 * | 4/2016 | Riden ..................... | B61L 23/34 |
| 2008/0073466 A1 * | 3/2008 | Mardirossian ......... | B61L 29/30 246/125 |
| 2008/0106726 A1 * | 5/2008 | Park ...................... | G07D 7/0026 356/71 |
| 2012/0026294 A1 * | 2/2012 | Rothenberger ....... | G01S 7/4802 348/46 |
| 2012/0136510 A1 * | 5/2012 | Min ........................ | G01S 17/88 701/2 |
| 2015/0015868 A1 * | 1/2015 | Jachman .................. | G01C 3/08 356/5.01 |

* cited by examiner

*Primary Examiner* — Daniel Previl
(74) *Attorney, Agent, or Firm* — Michael P. Kochka, Esq.

(57) ABSTRACT

An intrusion detection system and methods thereof are provided. In exemplary embodiments, the system may comprise an upper scanner adapted to create a first detection layer; a lower scanner adapted to create a second detection layer, the second detection layer overlapping the first detection layer; signal lighting for producing a visual signal; at least one server adapted analyze data received from the upper scanner and the lower scanner to determine if an object is in the path of the vehicle; and wherein the at least one server is adapted to activate the signal lighting when it is determined by the server that an object is in the path of the vehicle.

18 Claims, 14 Drawing Sheets

INTRUSION DETECTION SYSTEM AND METHODS THEREOF

CROSS-REFERENCE TO RELATED APPLICATIONS

The present application claims priority to U.S. Provisional Patent Application Ser. No. 61/999,073 entitled "Track Intrusion Detection System And Methods Thereof," filed Jul. 16, 2014, the disclosure of which is incorporated herein by reference in its entirety as if fully set forth herein.

BACKGROUND

Field of the Invention

Embodiments of the present invention are generally related to an intrusion detection system and methods thereof. More specifically, embodiments of the present invention relate to a detection and/or notification system designed to reduce injuries, fatalities, and other incidents resulting from the entrance of people and/or objects into the path of transit vehicles in a transportation area, such as a track or the like.

Description of Related Art

There are worldwide occurrences of injuries, fatalities and other incidents resulting from the entrance, accidental or intentional, of people and/or objects into the path of transit vehicles at designated passenger stations. There are several reasons why these incidents occur. For example, dangers caused by trains, or the like, may be caused at least partially due to the high speed at which trains travel, the weight of trains, the inability to deviate from a track, and the great distances trains may require to stop safely, or the like. Possibilities for accidents include collisions with vehicles, people, and/or other objects at passenger loading platforms, road crossings where a road or path crosses the train track, other portions of the track where people or objects may enter, and/or the like. Accordingly, several safety measures have been put into place.

Common conventional examples of safety measures include railway signals and gates at crossings and train whistles. Train whistles are designed to warn others of the presence of a train, and trackside signals are designed to maintain the distances between trains. Unfortunately, even with these safety measures collisions with vehicles, people, animals, and/or other objects are relatively common. Indeed, each year, several thousand collisions kill or injure hundreds of people.

In addition, generally, subway or railway platforms are open towards train tracks to allow passengers to board trains. As a consequence of the open platforms, accidents of passengers falling onto train tracks or colliding with trains that are entering the platforms frequently occur. In an effort to overcome the above problems, a yellow safety line is typically marked on a platform to warn passengers of the dangers of falling on the track or coming into contact with an oncoming train. However, the yellow safety line merely functions to attract attention for safety such that passengers stand back behind the safety line, but the line itself cannot actually function to block a passenger from falling onto the train track or colliding with a train. After a passenger or an object falls onto the tracks, typically unless train personnel or other passengers notice the fall, the passenger or object may remain in the path of the train undetectable by the train operator.

In addition to the injuries and/or fatalities caused by the direct collisions, rail-related accidents have the potential to also spread beyond the immediately surrounding and/or involved trains, cars, etc., resulting in harms apart from, or in addition to, the original collision or derailment. For example, derailments may result in major chemical leaks, fires, explosions, utility line damage, debris collisions with residential or commercial buildings, or the like.

Thus, it will be appreciated that a need exists for a detection and notification system designed to reduce these injuries, fatalities and other incidents, when implemented and operated by transit personnel in conjunction with the rules and regulation of a transit system, or the like.

SUMMARY

Embodiments of the present invention are generally related to an intrusion detection system and methods thereof. In one embodiment, a system may comprise an upper scanner positioned in an elevated position above the path of the vehicle, the upper scanner adapted to create a first detection layer; a lower scanner adapted to create a second detection layer, the second detection layer overlapping the first detection layer, the lower scanner positioned at a lower height than the upper scanner; signal lighting for producing a visual signal, the signal lighting positioned to warn the oncoming vehicle of the presence of the object in the path of the vehicle; at least one server in communication with the lower scanner, the upper scanner, and the signal lighting, the server comprising: one or more processors; and memory; wherein the at least one server is adapted analyze data received from the upper scanner and the lower scanner to determine if an object is in the path of the vehicle; and wherein the at least one server is adapted to activate the signal lighting when it is determined by the server that an object is in the path of the vehicle.

In another embodiment of the present disclosure, a system may comprise an upper scanner positioned in an elevated position above the path of the vehicle, the upper scanner adapted to create a first detection layer; a lower scanner adapted to create a second detection layer, the second detection layer overlapping the first detection layer, the lower scanner positioned at a lower height than the upper scanner; signal lighting for producing a visual signal, the signal lighting positioned to warn the oncoming vehicle of the presence of the object in the path of the vehicle; a verification camera positioned adjacent the path, the verification camera for providing visual verification of path conditions at least one server in communication with the lower scanner, the upper scanner, and the signal lighting, the server comprising: one or more processors; and memory; wherein the at least one server is adapted analyze data received from the upper scanner and the lower scanner to determine if an object is in the path of the vehicle; and wherein the at least one server is adapted to activate the signal lighting and platform lighting when it is determined by the server that an object is in the path of the vehicle; and wherein the upper scanner and the lower scanner comprise a laser scanner or an infrared beam device adapted to detect the size, speed and distance of an object within the first detection layer or the second detection layer In yet another embodiment of the present disclosure, a system may comprise an upper scanner positioned in an elevated position above the path of the vehicle, the upper scanner adapted to create a first detection layer; a lower scanner adapted to create a second detection layer, the second detection layer overlapping the first detection layer, the lower scanner positioned at a lower height than the upper scanner; signal lighting for producing a visual signal, the signal lighting positioned to warn the oncoming vehicle of the presence of the object in the path of the vehicle; at least one server in communication with the lower scanner, the upper scanner, and the signal lighting, the server comprising: one or more processors; and memory; wherein the at least one server is adapted analyze data received from the upper scanner and the lower scanner to determine if an object is in the path of the vehicle; wherein the at least one server is adapted to activate the signal lighting when it is determined by the server that an object is in the path of the vehicle; wherein the at least one server will not activate the signal lighting when the system is manually disabled via a secured switch or a key switch; and wherein the at least one server is adapted to notify transit personnel via electronic message if it is determined by the server that an object is in the path of the vehicle.

BRIEF DESCRIPTION OF THE DRAWINGS

So the manner in which the above-recited features of the present invention can be understood in detail, a more particular description of embodiments of the present invention, briefly summarized above, may be had by reference to embodiments, which are illustrated in the appended drawings. It is to be noted, however, the appended drawings illustrate only typical embodiments of embodiments encompassed within the scope of the present invention, and, therefore, are not to be considered limiting, for the present invention may admit to other equally effective embodiments, wherein.

Figure 1:
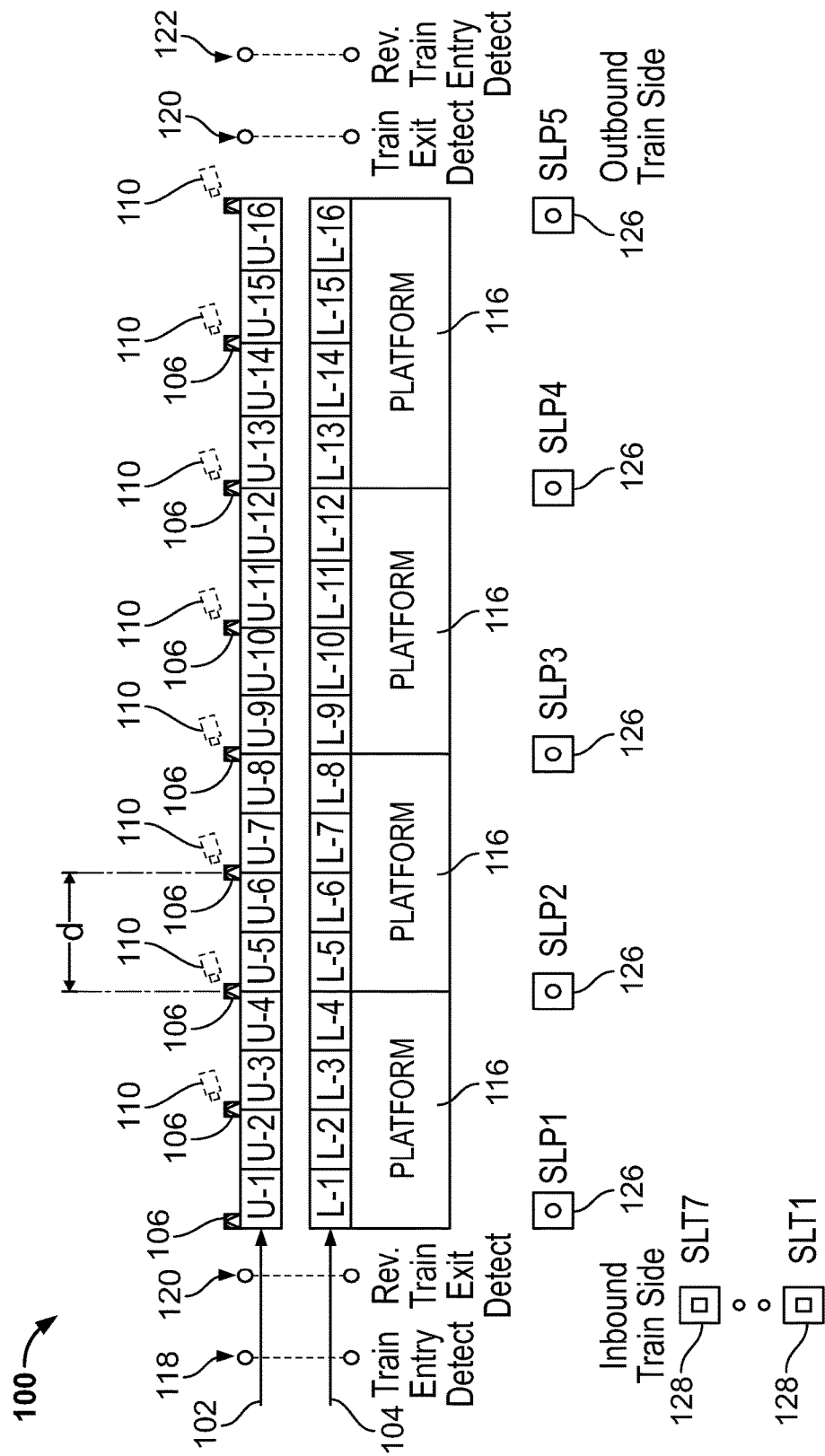
FIG. 1 depicts a block diagram illustrating a track intrusion detection system in accordance with embodiments of the present invention.

The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include", "including", and "includes" mean including but not limited to. To facilitate understanding, like reference numerals have been used, where possible, to designate like elements common to the figures.

DETAILED DESCRIPTION

Embodiments of the present invention are generally related to an intrusion detection system and methods thereof. More specifically, embodiments of the present invention relate to a detection and/or notification system designed to reduce injuries, fatalities, and other incidents resulting from the entrance of people and/or objects into the path of transit vehicles onto a portion of a track, or the like.

Figure 2:
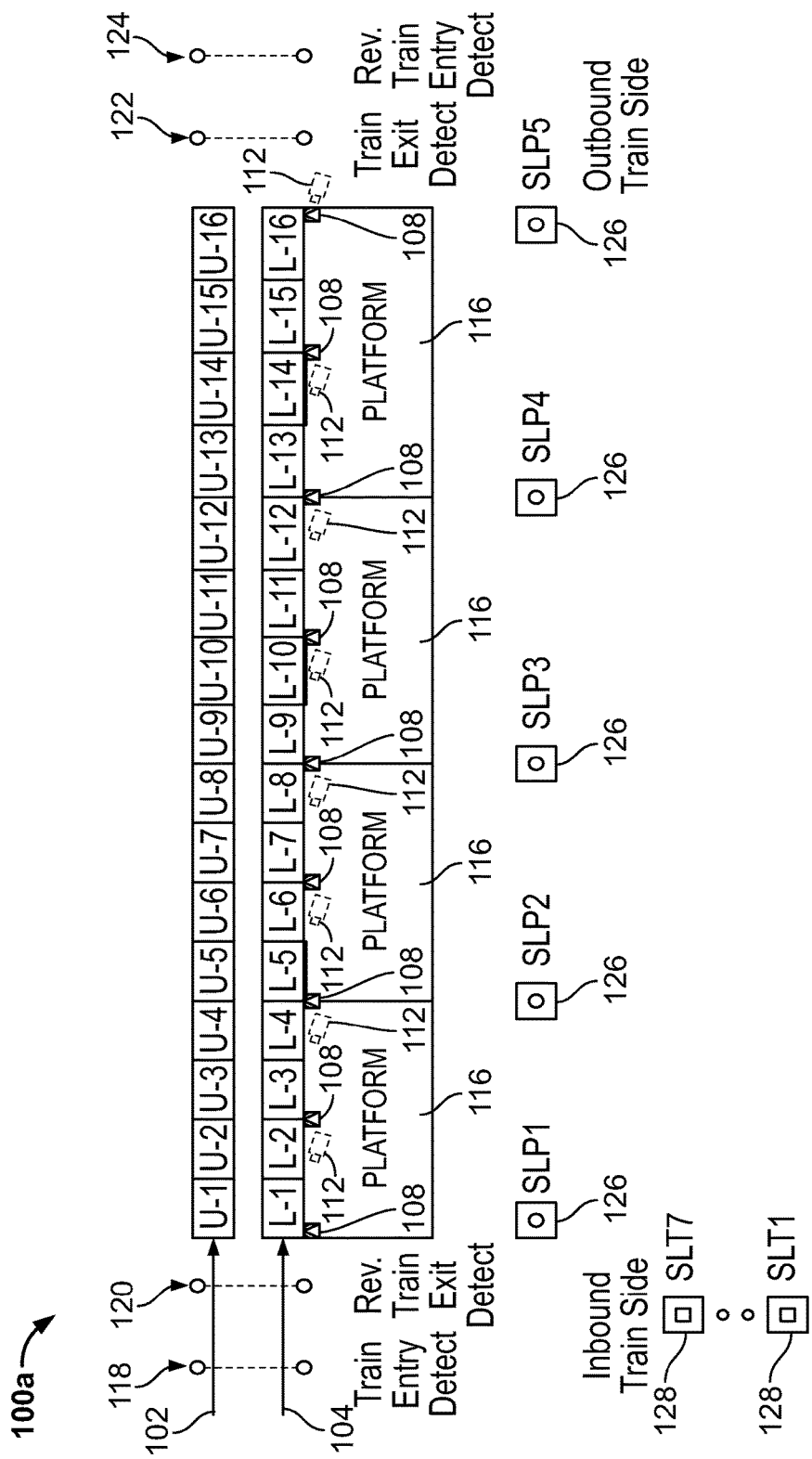
FIG. 2 depicts a block diagram illustrating an intrusion detection system in accordance with embodiments of the present invention.

FIGS. 1 and 2 depict a block diagrams illustrating track intrusion detection systems 100, 100a in accordance with embodiments of the present disclosure. In exemplary embodiments, a track intrusion detection system 100 may comprise laser scanners or infrared beam devices 106, 108; verification cameras 110, 112; signal lighting; notifications; engineer warnings; and a number of network components, or the like. Components of exemplary systems 100, 100a may be positioned on or near a platform 116, or the like. Although trains are described herein, some embodiments of the present disclosure may be used with any transportation system that utilizes a vehicle running on a track, a rail, a substantially set path, and/or the like to transport cargo, goods, passengers, and/or the like. Systems in accordance with embodiments of the present disclosure may comprise any number of rails consistent with the system, for example, one, two, three, four, or five rails, or the like. In addition to transportation systems, systems in accordance with exemplary embodiments of the present disclosure may be installed and/or utilized in any area in which intrusion detection is desired.

These components, when operating as described herein, produce the desired result of detecting the presence of a person or object in the direct path of a vehicle, such as a train or the like, substantially immediately producing a visual and/or audible signal to warn the oncoming vehicle and producing a visual and/or audible signal to notify transit personnel, or the like. When the system is utilized and an intrusion is detected, the oncoming vehicle and the transit personnel are notified of the occurrence substantially in real-time so they can take the appropriate action immediately, and/or the system may automatically take one or more corrective or safety measures to avoid or lessen the impact of a collision, or the like.

A system 100, 100a in accordance with exemplary embodiments may include various hardware components (mechanical, electrical, communications, etc.) to enable the system 100 to monitor a portion of a track area, for example, within a station, near a platform, or the like, to detect and alarm the presence of objects or people who enter and/or fall onto the track roadbed, or the like. Exemplary hardware components are described, infra. The system may also comprise one or more of various types of trains that are designed for particular purposes. A train may generally comprise a combination of one or more locomotives and attached railroad cars, a self-propelled multiple unit, a railcar, and/or the like. In addition to traditional rail systems, a system 100 in accordance with exemplary embodiments may be used in conjunction with systems utilizing atmospheric railways, monorails, high-speed railways, maglev, rubber-tired underground, funicular and cog railways, and/or the like.

A system 100, 100a may also be adapted to prevent false alarms and/or any injuries or harm that may be caused by a false alarm. For example, a false alarm caused by a small object such as a piece of paper or small debris that may cause no risk of actual harm to the train or its passengers, cargo, or the like, may cause the train or train personnel to take action, such as employing brakes to cause the train to come to an abrupt full stop. A substantially abrupt full stop may cause harm or wear and tear to the train or tracks and may cause injury to passengers, due to the abrupt or jerking nature of the stop. To prevent false alarms and the associated potential harm, a track intrusion detection system 100, 100a in accordance with exemplary embodiments may be designed to filter out other trains (moving or stationary), small objects (for example, those less than twelve to fifteen inches, or the like, and small animals (such as rodents, birds, or the like) and temporarily disable the intrusion detection system in zones through which the train is traveling.

In accordance with exemplary embodiments, the design of a track intrusion detection system 100 may generally depend upon the placement of the laser scanners 106, 108 near the track or in the train station, or the like, and analysis of the output data from the scanners 106, 108, or the like. In exemplary embodiments, the scanners 106, 108 may create a number of invisible detection layers, for example, two detection lasers, by being placed at different heights at equidistant or substantially equidistant points opposite a platform 116 (see FIGS. 3 and 4 for a more detailed illustration). This placement of scanners 106, 108 may provide redundant and overlapping detection zones, or the like, thereby providing full scanner coverage of the intrusion zones where a person and/or object may intrude upon, even if one of the scanners 106, 108 is disabled.

FIGS. 1 and 2 depict track sections U1-U16 (adjacent a platform 116), in an upper sensor zone 102, and track sections L1-L16 (adjacent a platform 116) in a lower sensor zone 104. The upper sensor zone 102 and lower sensor zone 104 may comprise scanners 106, 108 and/or cameras 110, 112. The upper sensor zone 102 may generally be positioned in a higher vertical location than the lower sensor zone 104 when compared with a track bed, the lowest point of the location to be monitored, and/or the like. For example, the upper sensor zone 102 may comprise a scanner 106 that scans on a plane that is generally higher vertically than a scanner 108 positioned in and scanning in the lower sensor zone 104. The scanners 106, 108, and cameras 110, 112 may be positioned in locations suitable for embodiments of the present disclosure. For example, the scanners 106 and/or cameras 110 may be disposed in an elevated position substantially above the tracks and the platform 116, aimed in a direction to create a first detection layer between the upper scanners 106 and a track bed next to the platform 116, or the like. The upper scanners 106 and lower scanners 108 may be placed at various intervals, indicated by symbol d in FIG. 1, near the tracks that may overlap. The intervals may comprise 25', 50', 100', 150', 190', 240', 270', or any distance suitable for producing the results consistent with the present disclosure. In accordance with exemplary embodiments, the term scanner may refer to a device that identifies the size, speed, and/or distance from the scanner of a person, vehicle, object or the like. The term "scanner" may generally refer to laser scan detectors, however the use of any suitable device for identifying an object's size, speed, and distance from the scanner is contemplated. The scanners 106, 108 may be mounted vertically or horizontally, or in any suitable configuration for identifying all objects in a certain area or zone to be monitored by the system 100, 100a. In some embodiments, the scanners 106, 108 may comprise dry-contact output connections and outputs via an IP interface, or the like, enabling the scanners 106, 108 to be communicatively connected to other system components and remote video applications, or the like. The system 100, 100a and/or scanners 106, 108 may comprise intelligent detection analysis to avoid false alarms and adjustable detection parameters. In some embodiments, scanners 106, 108 may also comprise a video camera, a thermal camera, and/or the like integrated within the scanners 106, 108.

In accordance with exemplary embodiments, a system 100, 100a and/or the scanners 106, 106, or the like, may receive information about an object, whether moving or stationary, that has entered the intrusion area or the area/zone to be monitored by the system 100, 100a. The system and/or the scanners 106, 108, or the like, may scan an area and collect data regarding the size, speed, and distance from the scanner ("scanner data"). Scanner data may be processed by the system 100, 100a and the presence of an object of a certain size, speed, and distance may be identified and safety measures may be taken by the system 100, 100a (e.g., signal lights may be activated, an alarm may be sounded, an electronic message may be generated, or the like). In some embodiments, certain threshold numbers for size, speed, and distance may be required for an alarm or safety measures to be initiated by the system 100, 100a to substantially minimize false alarms. The threshold numbers may be predetermined, set by an administrator, dynamically adjusted, and/or the like. In some embodiments 3D scanners may be used. A 3D scanner may comprise a device that analyses a real-world object or environment to collect data on its shape and/or its appearance. The collected data can then be used to construct digital three-dimensional models by the system 100, 100a. As used herein, the terms "laser" and "scanner" may generally be used interchangeably and may refer to a laser scanner, a device that detects the size, speed, and location of an object, or the like.

In some embodiments, the scanners 106, 108 may operate in a certain range. For example, the scanners 106, 108 may operate in a 20-40 m radius for a 90-360 degrees range, or the like. The scanners 106, 108 may comprise an automatic area setting function, an environmental disqualification circuit, adjustable detection areas, a built in heater and/or cooler, an alarm duration and type setting function, and/or the like. The scanners 106, 108 or the system 100, 100a, may also be able to detect if the scanners have been tampered with 106, 108 through physical access to the scanners or unauthorized electronic access, and may be configured to minimize false alarms due to weather conditions such as rain, fog, snow, and/or the like.

In accordance with exemplary embodiments of the present disclosure, upper scanners 106 may be placed at a height above a track bed and positioned at an angle with a target below a platform 116 edge, or the like. Although a "track bed" is used herein as an example, any suitable area desired to be monitored by a system 100, 100a in accordance with exemplary embodiments of the present disclosure may be used. The area does not necessarily need to include tracks, or the like, it may simply be an area to be monitored. The term "track bed" is used throughout, and wherever this term is used alternative examples of areas to be monitored are contemplated.

The upper scanners 106 and lower scanners 108 may be placed at suitable locations and pointed in suitable directions for monitoring an entire zone. The range of the upper scanners 106 and/or lower scanners 108 may overlap and/or intersect and cover the entire zone to be monitored. By way of example, in some embodiments, the upper scanners 106 and/or lower scanners 108 may be placed at a height of 3.0'-10.0' above the track bed and with a target of 3.0"-9" below the platform 116 edge. The upper scanners 106 and the lower scanners 108 may be spaced horizontally apart at substantially the same height, for example, 50' apart. Lower scanners 108 may be placed at a height below the upper scanners 106 or at the same height as the upper scanners 106 and above the track bed, and positioned horizontally with a target directly across, or substantially directly across the tracks below the platform 116, or the like. For example, lower scanners may be placed at a height of 2.0' above the track bed and positioned horizontally with a target directly across the tracks below the platform 116.

In exemplary embodiments, an upper scanner 106 may be directed at a portion of a track bed, or the like, away from the platform 116, or the like. In some embodiments, the lower scanner 108 may be directed a certain distance away and below the platform 116. In one embodiment, the lower scanner 108 is directed at a portion of the track bed running through a point located approximately 6" away from the platform and 6" below the platform. When a track intrusion detection system 100, 100a in accordance with exemplary embodiments is in use, if an object greater than a certain size (for example, approximately 8" to 24") passes through or remains within the sensing range of either the upper scanner 106 and/or lower scanner 108 for a certain period of time, a message may be transmitted to a server via the system network (please see exemplary system networks infra) and/or security measures, such as activating signal lighting and/or slowing/stopping an oncoming train, may be implemented. System software in accordance with embodiments of the present disclosure may be provided. The software may analyze message(s) or indication(s) that a track intrusion, or the like, has been detected by the system 100, 100a, and perform a number of security measures, or corrective or preventative actions, to attempt to avoid and/or minimize harm that may ensue if a collision occurs.

In accordance with exemplary embodiments of the present disclosure, if an intrusion event occurs and one or more sensors 106, 108 detects an intrusion has occurred, the system 100, 100a may activate signal lighting at the station entrance, or the like, to warn any oncoming trains of an intrusion condition. The system 100 may also activate signal lighting at the portion of the platform, or the like, where the intrusion condition has occurred to identify/call attention to the area where the intrusion occurred to transportation personnel, or the like. The system 100, 100a, may also activate other audible, visual, and or electronic message alerts. Electronic message alerts may comprise, electronic communications such as wired or wireless messages, text messages, video messages, audio messages, and/or the like, and may be transmitted to an administrator, an individual, a group of individuals, another system, another device, and/or the like, to produce a notification that an intrusion event (e.g., a person or object has entered the area to be monitored) has occurred. The system 100, 100a may also produce an appropriate notification for local and remote monitoring locations. In exemplary embodiments, an intrusion event may generally occur if an object greater than a certain size passes through or remains within the sensing range of either scanner 106, 108 for a certain time. For example, the object may have to be 12" in size and remain within the sensing range of a scanner 106, 108, for five seconds, or the like.

In accordance with exemplary embodiments, to avoid false alarms, the system 100 may be adapted to ignore an intrusion event in certain circumstances. For example, the system 100 may be adapted to ignore an intrusion event caused by the presence of another train, or the like, when the train is entering station from either end at a certain speed (for example, 20 mph) or exiting station from either end at a certain speed (for example, 20 mph), or anywhere when train is standing at the station, or the like.

By way of example, a system 100, 100a may comprise one or more entry detection beams 118, 120 spaced apart at suitable distances to determine if a train is passing by. The direction beams 118, 120 may comprise infrared beams, or the like, that may detect if a train or vehicle is passing through the station, or the like. The beams described herein may be devices that detect the size, speed, and/or location of objects in the path of the device. If both beam 118 and beam 120 simultaneously detect an object of a certain size moving at a predetermined speed (for example, over 20 mph), the system 100, 100a may recognize the object as a train, or the like, and the system 100, 100a may disable the track intrusion detection functionality while the train is moving through the zones of the system and until it has cleared train exit beams 120, 122, or the like. The train entry detection beams 118, 120 may be spaced at a distance apart suitable for identifying a train, a vehicle, or the like. For example, the train entry detection beam 118 may be placed 50' apart from the second train entry detection beam 120. Similarly, the train exit detection beams 120, 122 may be spaced at a distance apart suitable for identifying a train, a vehicle, or the like. For example, train exit detection beam 120 may be placed 50' apart from the second train entry detection beam 122.

In exemplary embodiments, the system 100 may be adapted to ignore an intrusion event when the system 100 is manually disabled during track maintenance via a key switch, a secured switch, or the like, that may be located on the system platform or the system console, or the like. In some embodiments, only specific individuals with appropriate security clearance set by an administrator may be provided with access to bypass the system 100, 100a manually, or the like. For example, certain transit personnel may be granted access to, and the responsibility for, the bypass operation, or the like. In exemplary embodiments, the system 100 may produce an alarm log for the local and remote train personnel, or the like. Entries in an alarm log may be acknowledged and closed as the events are handled, or the like.

In some embodiments, visual verification cameras 110, 112 may be included in a system of track intrusion detection 100, 100a or the like. In exemplary embodiments, visual verification cameras 100, 112 may provide visual verification of the track conditions to the station personnel, or the like. Visual verification may allow a proper response to the intrusion event depending on the circumstances. The cameras 110, 112 may be strategically placed along the path of one or more trains at a portion of the track U-1-U-16 and L-1-L-16; for example, at a train station, to provide complete or substantially complete coverage of the track, or the like. Analytic software in accordance with exemplary embodiments may be adapted to select an appropriate camera image to display to station personnel, or the like, and the closest platform signal light 126 to the intrusion to light, in order to provide the optimal view of an event, or the like. The appropriate camera image may comprise optical view(s)

(standard as the eye can see, or the like) and/or thermal view(s) (only detects objects emitting a heat signature that differs from the ambient temperature, or the like). For example, the system may comprise a thermographic camera (infrared camera or thermal imaging camera) that forms an image using infrared radiation, and operating in wavelengths as long as 14,000 nm (14 µm), or the like. In some embodiments, a system 100, 100a may include tunnel signal lights 128 that may be activated whenever an intrusion event occurs to alert any oncoming trains or vehicles. The signal lights 126, 128 may comprise any suitable light that would alert the train operator and/or train station personnel of an intrusion event on the track bed, or the like, or provide light to the area where the intrusion occurred to bring attention to the person/object that caused the intrusion.

In exemplary embodiments, images may be recorded via a video management server and may be retained for a specified period of time, for example, 6 months, 1 year, 5 years, 10 years, or the like. In a system 100 in accordance with embodiments of the present disclosure, recording may be activated by an event. The event may include, for example, track intrusion detected by a laser scanner 106, 108 that may activate specific camera(s) 110, 112 covering the laser area, or the like. The event may also include, for example, a train entering and/or exiting a station or a portion of the track, which may activate some or all appropriate cameras 110, 112 to capture "last moment" intrusion events, wherein a person or object enters the laser area or the track at a "last moment", or wherein insufficient time is provided for the train, or the like, to stop prior to a collision with the person or object. In some embodiments, the cameras 110, 112 may be motion activated, and may be adapted to capture all motion within a camera's 110, 112 field of view, or the like.

In some embodiments, the system 100, via use of the scanners 106, 108 may identify the location of an intrusion event and notify the system users/personnel where the intrusion has occurred. In some embodiments, tunnel signal lights 128 within a predetermined distance from the intrusion event may be activated for all intrusion events. In some embodiments, platform signal lights 126 may be activated only on the section of the platform where the intrusion occurred, thereby providing other passengers, transit personnel, or the like, a visual indication as to where the intrusion occurred. As such, the transit personnel and/or bystanders may be able to identify where the intrusion has occurred and may try to save the person or object that caused an intrusion alert before the train or other vehicle reaches the spot of the intrusion and collides with the object or thing that caused the intrusion, or the like. In some embodiments, the system 100, 100a, may activate an automated safety measure, such as an automated ladder, door to a safe room/space, stairs, straps, or a rope to allow the individual that caused the intrusion event to escape the track bed, or the like.

In some embodiments, train entrance beams 118, 120 may comprise IR beams for detecting the presence of a train, or the like. When the presence of a train coming though during the normal course of business is detected by the train entrance beams 118, 120, the intrusion detection system 100 may be bypassed temporarily so that the train does not set of an alarm, or the like, when detected by the lasers 106, the cameras 110, and/or the like. In some embodiments train exit beams 120, 122 may detect when a train has passed through and/or cleared the zones monitored by the system 100 and causes the system 100 to reactivate and/or re-enable, wherein the scanners 106, 108 and/or cameras 110 will again notify the system 100 of an intrusion. In some embodiments, the exit beams may receive information about the measurements, dimensions, and/or length of the train and the system may calculate when the train, or the like, is passing through each zone to be scanned by the system 100. The system 100 may then re-enable each zone as the train clears through each zone in real-time, based on the information received from the exit beams 120, 122, and/or the like.

In some exemplary embodiments the system 100, 100a, is communicatively coupled with, and/or communicates with a train, vehicle, or the like that may pass through the area or zone to be monitored by the system 100, 100a. The system 100, 100a may communicate with the vehicle using Institute of Electrical and Electronics Engineers (IEEE) standards, such as communications-based train control (CBTC), or other suitable standards to control the speed and/or halt the motion of the train. For example, if an intrusion event is detected by the scanners 106, 108, the cameras 110, 112 and it is determined by the system 100, 100a that the intrusion is not a false alarm and the manual override has not been activated, the system 100, 100a may automatically reduce the speed and/or halt the motion of the train via a communications protocol such as CBTC, or the like.

In some embodiments, 1474.1-2004—IEEE Standard for CBTC may be used by the system 100, 100a to communicate with a train, or the like. In some embodiments, performance and functional requirements for a system 100, 100a are established in the 1474.1-2004—IEEE Standard, or the like. A CBTC system is a continuous, automatic train control system utilizing high-resolution train location determination, independent of track circuits; continuous, high-capacity, bidirectional train-to-wayside data communications; and train-borne and wayside processors capable of implementing automatic train protection (ATP) functions, as well as optional automatic train operation (ATO) and automatic train supervision (ATS) functions. In addition to CBTC functional requirements, this standard also defines headway criteria, system safety criteria, and system availability criteria for a CBTC system. This standard is applicable to the full range of transit applications including automated people movers, or the like.

Figure 3:
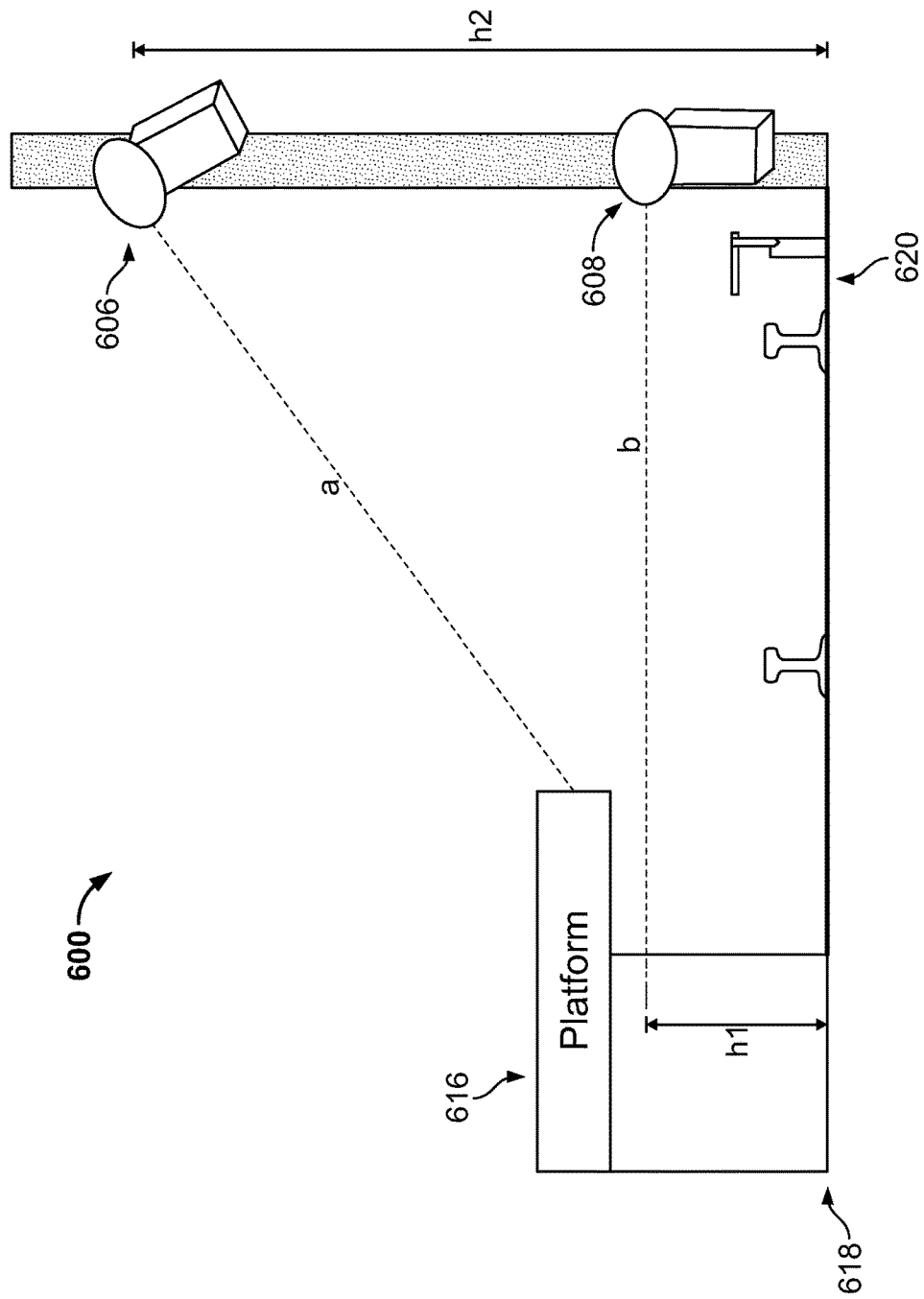
FIG. 3 depicts a cross-section of a portion of an exemplary track intrusion detection system in accordance with embodiments of the present invention.
Figure 4:
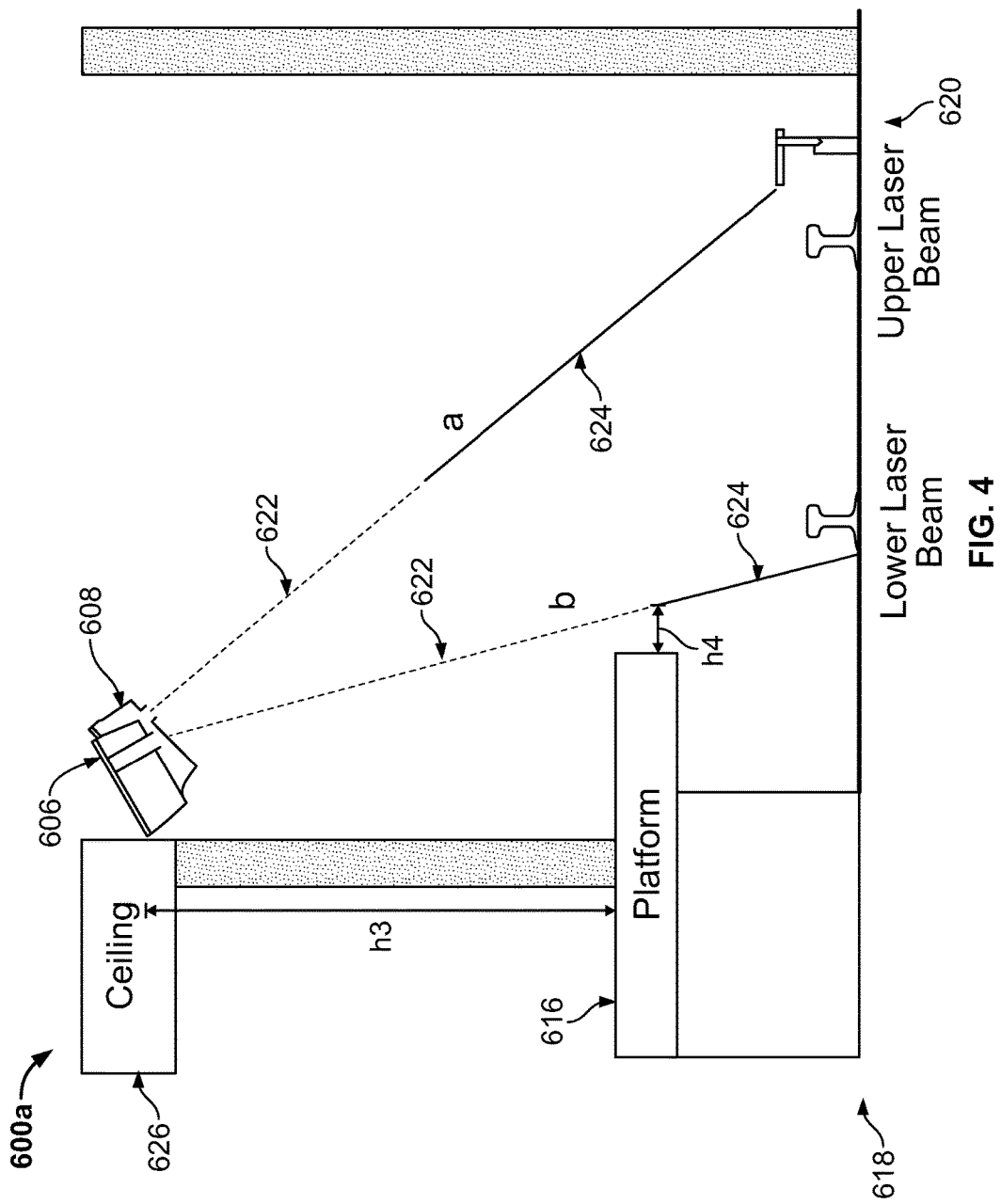
FIG. 4 depicts a cross-section of a portion of an exemplary track intrusion detection system in accordance with embodiments of the present invention.

FIGS. 3 and 4 depict cross sections of exemplary systems 600, 600a of a track intrusion detection system 100 in accordance with embodiments of the present disclosure. In exemplary embodiments, a system 600, 600a may comprise an upper laser scanner 606 and a lower laser scanner 608, or the like. The scanners 606, 608 may be communicatively connected to network components either via a wired connection or a wireless connection, or the like. Exemplary network components are described below. Although the terms "upper" and "lower" are used, they do not necessarily indicate that one scanner is positioned vertically higher/lower than another scanner. The terms "upper" and "lower" may generally indicate where the scanning zone of each laser is. For example, the "upper" scanner 608 will be generally pointed and/or positioned at a higher point than the "lower" 606 scanner, or the like. As used herein, the word "track" is used as an example of an area to be monitored. It is contemplated that "track" may also refer to any area to be monitored, and that embodiments of the present disclosure may include areas that are or are not part of a railroad or transportation system, or the like. Embodiments of the present invention may be used with any area to be monitored for intrusion.

In exemplary embodiments, the scanners 606, 608 may be adapted to detect the presence of an object within the field of scanning. The angles and heights shown in FIGS. 3 and 4 are not drawn to scale. For example, the field of scanning of the upper scanner 606, indicated by symbol a, is depicted as substantially pointing at a platform 616 (See FIG. 3) or substantially away from the platform 616 (See FIG. 4). However, in some embodiments of the present disclosure, the field of scanning a will actually be pointed at a higher or lower location in relation to the platform 616.

In some embodiments, the field of scanning a will be pointed below the platform 616, for example, 6.0" below the platform 616, or the like. Similarly, the height between a roadbed 618 and the upper scanner 606, indicated by symbol h2, may vary dependent on the configuration of the platform 616, the tracks 620, or the like. Referring now to FIG. 3, in some embodiments, the height h2 between the roadbed 618, or the like, and the upper scanner 606 may be 8.0 feet, 16.0 feet, or the like. Referring to FIG. 4, the height between a platform 616 and a ceiling 626 and/or the scanners 606, 608 indicated by symbol h3, may vary dependent on the configuration of the platform 616, the scanners 606, 608, or the like. For example, the distance between the platform 616 and the scanners 606, 608 and/or the ceiling 626 may be 6', 8', 12', 15', or the like. The distance h4 between the field of scanning of the lower scanner 608, indicated by symbol b, and the platform 616, may be 3", 6", 9", 12" and/or the like. The tracks 620, platform 616, and roadbed 618 may be suitable for use with embodiments of the present disclosure described herein.

In exemplary embodiments, the fields of scanning a, b, may comprise inactive zones 622 and active zones 624, or the like. The inactive zones 622 may be configured to minimize false alarms, so that detection of a person/object, or the like, in the inactive zones 622 does not trigger an alarm or activate security measures by the system 600, 600*a*. In some embodiments, the inactive zones 622 and active zones 624 are configured that intrusions into the inactive zones 622 does not trigger an intrusion event and intrusions into the active zones 624 triggers an intrusion event and the system 600, 600*a* then activates security measures and/or the like as described herein. The active zones 624 and inactive zones 622 may be configurable by the system 600, 600*a* such that the size/length of the active zones 624 and inactive zones 622 may be independently configurable. By way of example if a user passes his or her bag/luggage through an inactive zone 622, the system 600, 600*a* may identify the intrusion into the inactive zone as a false alarm. However, if an object of sufficient size, as determined by the system 600, 600*a*, intrudes into the active zones 624, an intrusion event will be activated by the system 600, 600*a* and a corresponding corrective action, such as alarms, lights, messages, automatically showing down or stopping an oncoming train, will be activated.

In addition a field of scanning of the lower scanner 608, indicated by symbol b, is depicted as substantially pointing beneath the platform 616 (FIG. 3) or away from the platform 616 (FIG. 4). However, in some embodiments of the present disclosure, the field of scanning b may be pointed at a higher or lower location in relation to the platform 616. The field of scanning a will be pointed substantially directly at the platform 616, or away from the platform 616, or the like. Referring to FIG. 3, the height between a roadbed 618 and the lower scanner 608, indicated by symbol h1, may vary dependent on the configuration of the platform 616, the tracks 620, or the like. In some embodiments, the height h1 between the roadbed 618, or the like, and the upper scanner 606 may be 8.0 feet, or the like.

In accordance with exemplary embodiments of the present disclosure, the scanners 606, 608 components may functions as a primary detection device in the system 100.

The design of the system 100 is generally dependent on the placement, operation and adjustment of multiple scanners 606, 608 working in conjunction with each other, or the like. In accordance with exemplary embodiments, the configuration of the scanners 606, 608 may be opposite a passenger platform 616, (See FIG. 3) mounted at alternating high/low heights from the track 620 level, substantially or exactly equidistant from each other to form a redundant detection zone. In some embodiments, the configuration of the lasers 606, 608 may be the same side as a passenger platform 616, (See FIG. 4) mounted at substantially the same height from the track 620 level, substantially or exactly equidistant from each other to form a redundant detection zone. In some embodiments, the scanners 606, 608 may be spaced horizontally apart, for example, 25', 50' 75', or 100' apart, or the like. The detection zone may provide both detection of train presence and person or object as described further herein. As used herein, the terms "laser" and "scanner" may be used interchangeably and generally refer to a device capable of generating a field of scanning for detecting the presence of a person, animal, vehicle, object, or the like of a certain size and notifying the system of the presence of such a person, animal, vehicle, object, or the like.

In exemplary embodiments of the present disclosure, a laser or scanner sensor 606, 608 may be capable of detecting size, speed and distance of object within the field of coverage. The field of coverage may vary depending on the strength of the laser used and the requirements of the system 600, 600*a*, including the configuration of the tracks 620 and the platform 616, or the like. In some embodiments, each sensor 606, 608 may produce a field of coverage of approximately 100'×200'. The sensors 606, 608 may be adapted to produce an IR beam. The IR beam may comprise, for example a four channel photo beam that may accurately detect the train presence at the before the station entrance and at the exit when the beam is broken. When the sensors 606, 608 detect an intrusion event that does not fall within the exception of a very small object, an authorized train, or a system override, the sensors 606, 608 may be adapted to notify the system data collected by the sensors 606, 608 indicating a possible intrusion of a person, animal, vehicle, object, and/or the like into the field of coverage, or the like.

In exemplary embodiments, the system 600, 600*a* may comprise sensors 606, 608 that may be located at suitable locations for detecting the intrusion of an object or person in an area of a track or area to be monitored. The examples shown in the figures are merely for exemplary purposes, all suitable configurations and/or positioning of system components are contemplated by and within embodiments of the present disclosure. In accordance with exemplary embodiments, when an intrusion is detected in a certain area, the system 600, 600*a* identifies, via the sensors, where the intrusion occurred and activates a notification on the platform of the intrusion. The notification may comprise audible alarms or notifications, visual notifications, lights, spotlights on the area of intrusion, and/or the like. In addition, the system 600, 600*a* may be adapted to notify users of the system, such as transit personnel, with alerts such as electronic messages, telephone calls, text/SMS messages, and/or the like.

In some embodiments, the system 600, 600*a* may comprise two or more beams that detect the presence of a train. The beams may be spaced apart horizontally at a predetermined distance so when both beams detect the presence of an object, the system 600, 600*a* will be notified that the object is a train and the system 600, 600*a* will be deactivated for intrusion detection along the portion of the path the train is entering, or the like. As such, when a train is entering an area to be monitored by the system 600, 600*a*, and the system determines that a train is passing through, the alarm/notification system, or the like, will be bypassed or disabled when the train is passing through and re-enabled when the train leaves the area. The system 600, 600*a* may comprise additional beams to determine when the train has passed through and left the area so the bypass, or the like, may be disabled.

Figure 5:
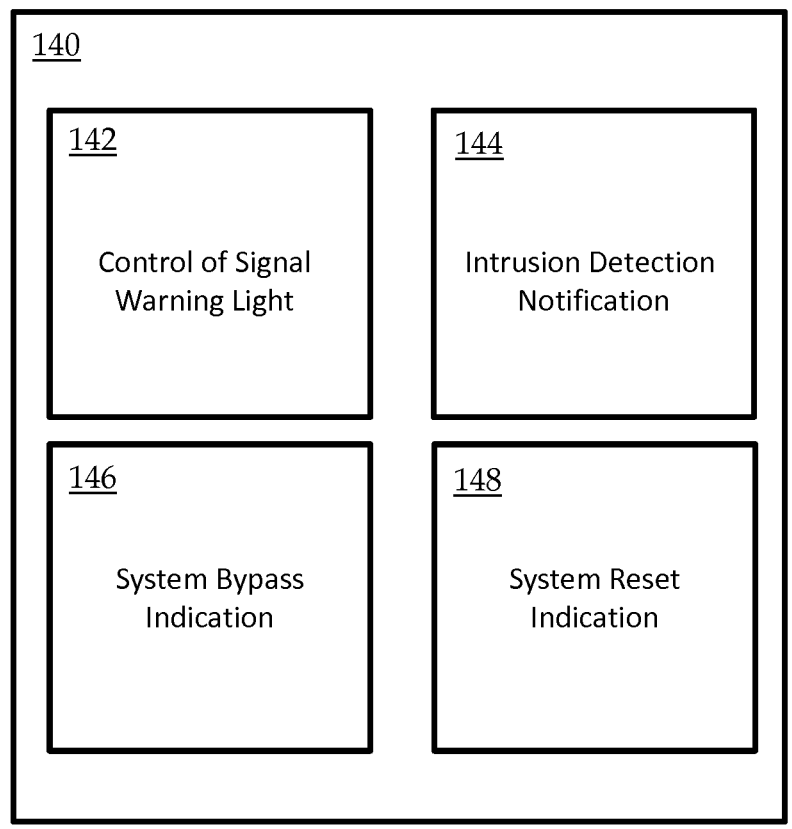
FIG. 5 depicts a block diagram illustrating modules of a track intrusion detection system in accordance with embodiments of the present invention.

FIG. 5 depicts a block diagram illustrating modules of a track intrusion detection system analytic software system 140 in accordance with embodiments of the present invention. In some embodiments, the analytic software 140 may comprise several modules. For example, the software 140 may comprise a control of signal warning light module 142, an intrusion detection notification module 144, a system bypass module 146, and/or a system reset module 148, and/or the like. The system software 140 may function as the intelligence of the system, or the like. The software 140 may analyze the input it receives from the lasers (See FIGS. 3 and 4, 606, 608), a bypass switch, and/or the system operator, to effectively produce resulting notifications.

In some embodiments, the software 140 may be stored and/or executable on one or more servers. For example, one or two servers may be included at each platform in a transit system, each server communicatively coupled to run a software system 140 in accordance with embodiments of the present disclosure and perform the steps disclosed herein, or the like. In some embodiments, a master server may be included that executes the software 140 and/or stores data collected by the system, or the like. In some embodiments, a central server may be included in the system wherein the central server stores data a serves as a central repository for system data. The system may comprise an archiving hierarchy that is flexible/configurable by an administrator, or the like. The central repository may store video recordings, data logs, or any data collected by the system, or the like.

Each of the modules 142, 144, 146, 148 of the analytic software system 140 may produce a different notification. Notifications may include control of signal warning light to vehicle; an intrusion detection notification; a system bypass indication; a system reset indication. A primary function of a software system 140 may be to determine if a valid intrusion exists and if so, activate (or illuminate) track signal warning lights to the train, subway, or vehicle operator and notify appropriate transit personnel, or the like. A valid intrusion is one that occurs at a time when neither of the following conditions exists: (1) a transit vehicle is entering a station, or the like as indicated by laser detection or (2) transit workers, or the like, are performing track maintenance as indicated by the activation of the bypass switch, or the like.

In accordance with embodiments of the present disclosure a track intrusion detection system may comprise a control of signal warning light module 142. The warning light module 142 may be adapted differently based on station configuration, or the like, but will function to produce a visual indication to the transit vehicle operator, or the like, that a track intrusion condition exists and the motion of the train must be modified to avoid collision with the person or object in the vehicle's path. In accordance with exemplary embodiments, this signal may remain illuminated until the transit personnel determine that the condition no longer exists at which time the system or the personal may extinguish the signal. An option exists for the signal to extinguish automatically after a period of time when the system no longer detects an object in the vehicle path.

In accordance with exemplary embodiments, a signal warning light may comprise a series of flashing lights/strobes to be installed at regular intervals, for example, every sixty feet in approach to a station, or the like, and/or within the station limit to warn approaching trains of ongoing intrusion incidents. The flashing lights may be spread out to cover the length of the station, or the like, as well as an area in approach to the station, for example, beginning about four hundred feet in approach to the station. The system may comprise a member for resetting the flashing lights/strobes locally from the station area and remotely from a control area, or the like. In accordance with exemplary embodiments of the present disclosure, the system resent indication 148 may allow an authorized user to reset the system, including the signal warning light, the intrusion detection notification, the system bypass indication, or the like.

In accordance with exemplary embodiments, flashing lights, or the like, may be activated by a switch closure as part of the system. In exemplary embodiments, when the intrusion detection notification module 144, working with the scanners, determines that an intrusion has occurred, the control of signal warning light module 142 may activate a signal warning light to produce a visual indication to the transit vehicle operator that a track intrusion condition exists and the motion of the train must be modified to avoid collision with the person or object in the vehicle's path.

In accordance with exemplary embodiments, lights on a platform may be strategically located to correspond with intrusion detection zones. For example, when an intrusion is detected, a light closest (within 100') will be illuminated to notify station personnel of the approximate intrusion location. In general, signal lights may remain illuminated until the transit personnel, or the like, determine that the condition no longer exists at which time they will extinguish the signal. This may be completed by means of a system console in the station, at a control center, and/or by a key-switch located on the station platform, or the like.

In accordance with exemplary embodiments of the present disclosure, the intrusion detection notification module 144 may detect an intrusion with the scanners, as described above, and generate an intrusion detection notification. A control center, or the like, may then receive an indication (visual, software based etc.) from the system that the station lights/strobes, or the like, have been activated. A notification may provide information to the following parties: station personnel; command center personnel; and/or other authorized transit staff, or the like.

In accordance with exemplary embodiments, a system may generate or produce a notification display of the following: intrusion events; an intrusion signal condition; a system bypass condition, as generated by the system bypass indication module 146, and/or a system reset condition, as generated by the system reset indication module 148, and/or the like. In some embodiments, the system bypass indication may be initiated by a physical switch, a button, a touch screen, a device for activating a bypass, any suitable electronic or physical activator, and/or the like. In some embodiments, a system reset indication 148 may comprise a separate switch, button, option on a touch screen panel, any suitable activation member for initiating the system reset indication 148, or the like.

In some embodiments of the present disclosure, a system 140 may comprise a system reset indication 148 that may reset the system 140 in certain zones and/or reset the status of the entire system 148, or the like. In some embodiments, after an intrusion is detected on the tracks or in a specified area to be monitored and it is determined that the intrusion has been cleared, a user may reset the system using the system reset 148. Any indication and/or condition presented herein may be in the form of a textual log produced on a computer display consisting of the actual date and time of each event, or an electronic message sent to a remote device, for example, via wired or wireless connections. A textual log may generally comprise a sequential list of events with the most current event normally showing at the top, or the like. The system reset indication 148 may be activated to deactivate signal lighting, or the like after it is determined, by the system or a system user, that an intrusion event is over.

In accordance with exemplary embodiments, each intrusion event may produce and display visual information for the specific camera associated with the event, or the like. An audible alarm at the monitoring station may also be sounded and/or activated. In accordance with exemplary embodiments, a mesh based wireless network may be implemented in a station and incoming tunnel, thereby allowing audible notification and visual verification to be provided to the vehicle engineer in real-time, or substantially in real-time, or the like. As a vehicle approaches a station, if an intrusion condition exists, a warning signal will be heard and a video monitor will illuminate with live motion video images of an area of the track where the intrusion has been detected. This signal and video may provide the engineer and/or the system with crucial time sensitive information allowing them to react to the condition appropriately according with recommended regulations, or the like.

Figure 6:
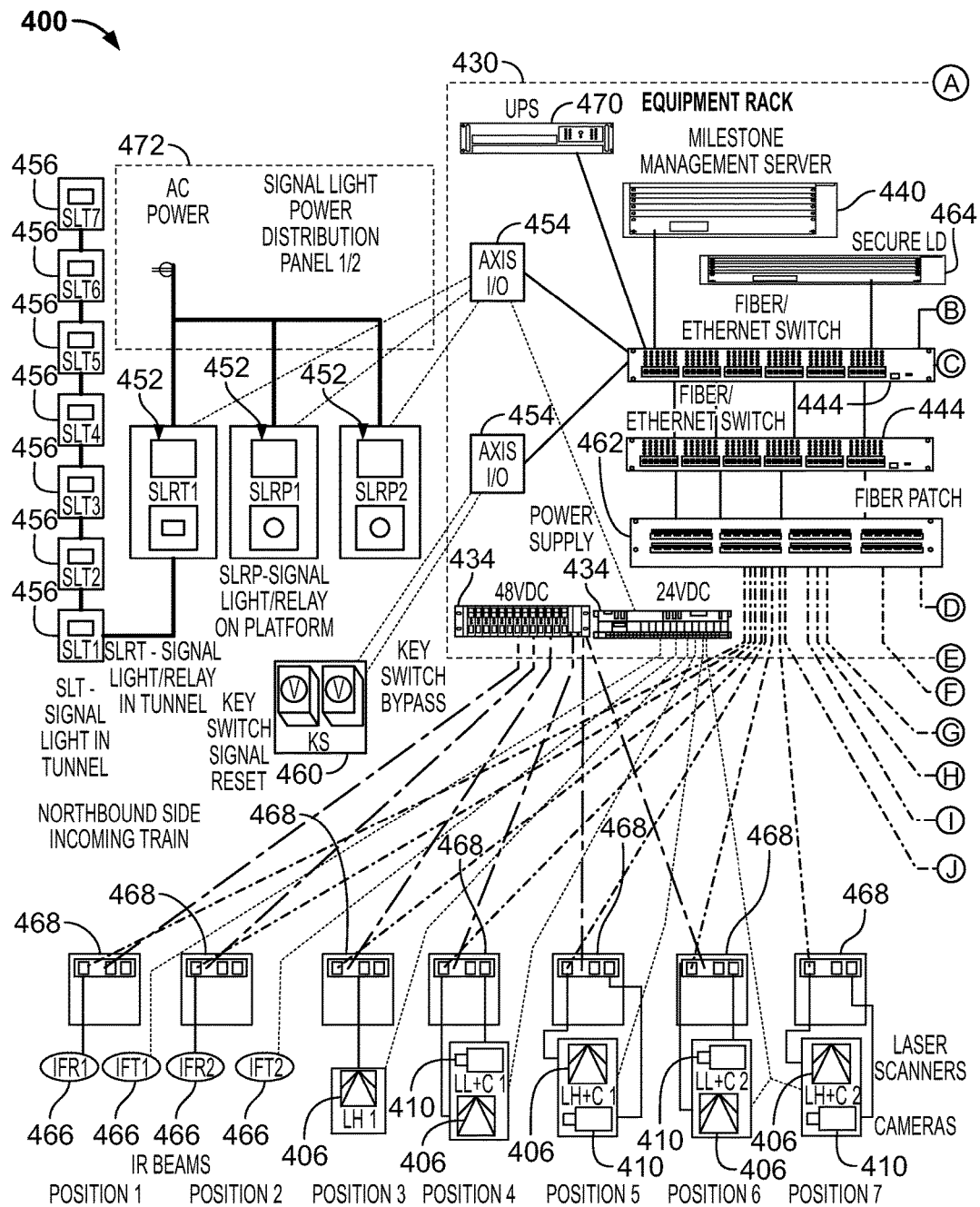
FIG. 6 depicts system-level network diagram illustrating an exemplary track intrusion detection system in accordance with embodiments of the present invention.
Figure 6:
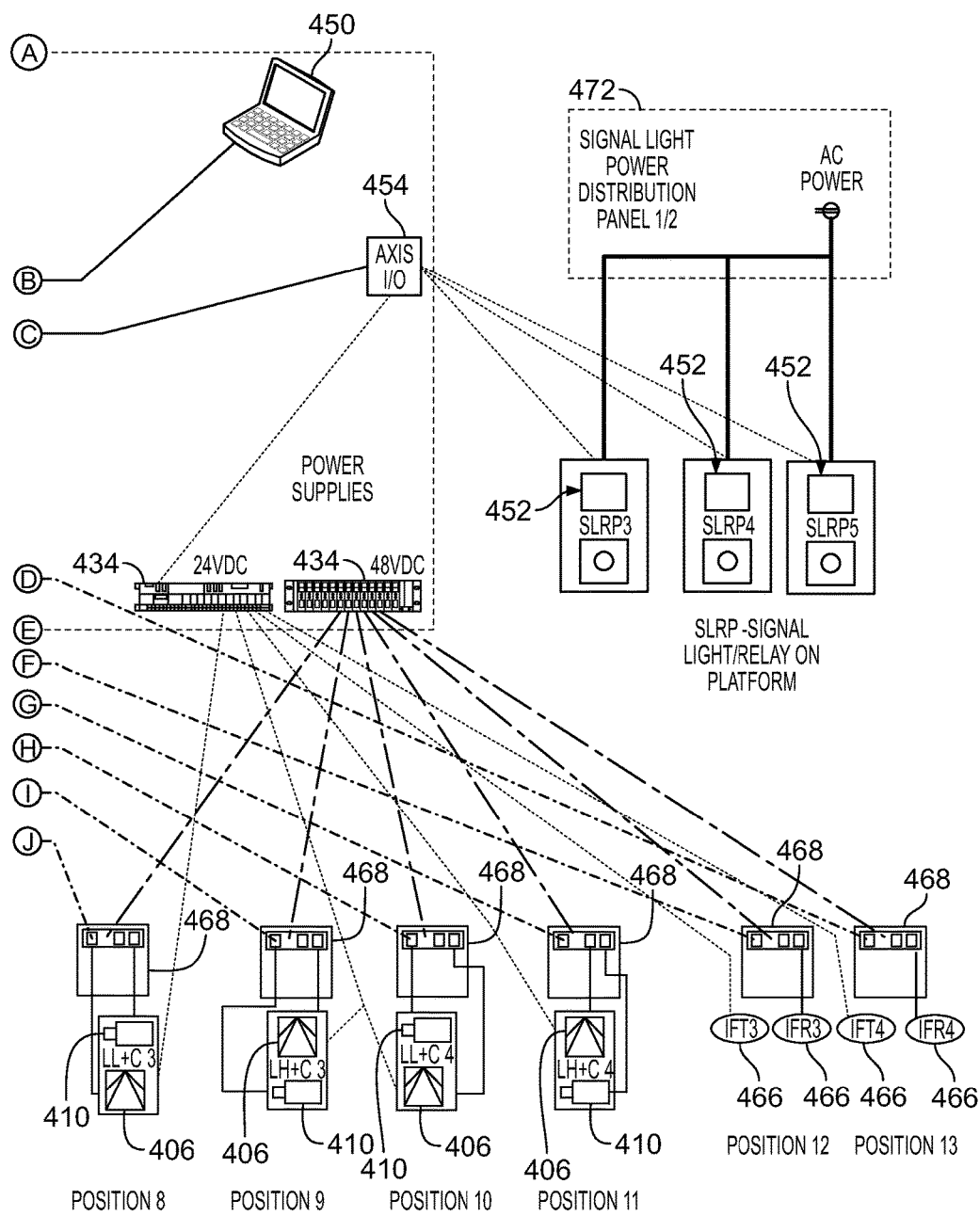
Figure 7:
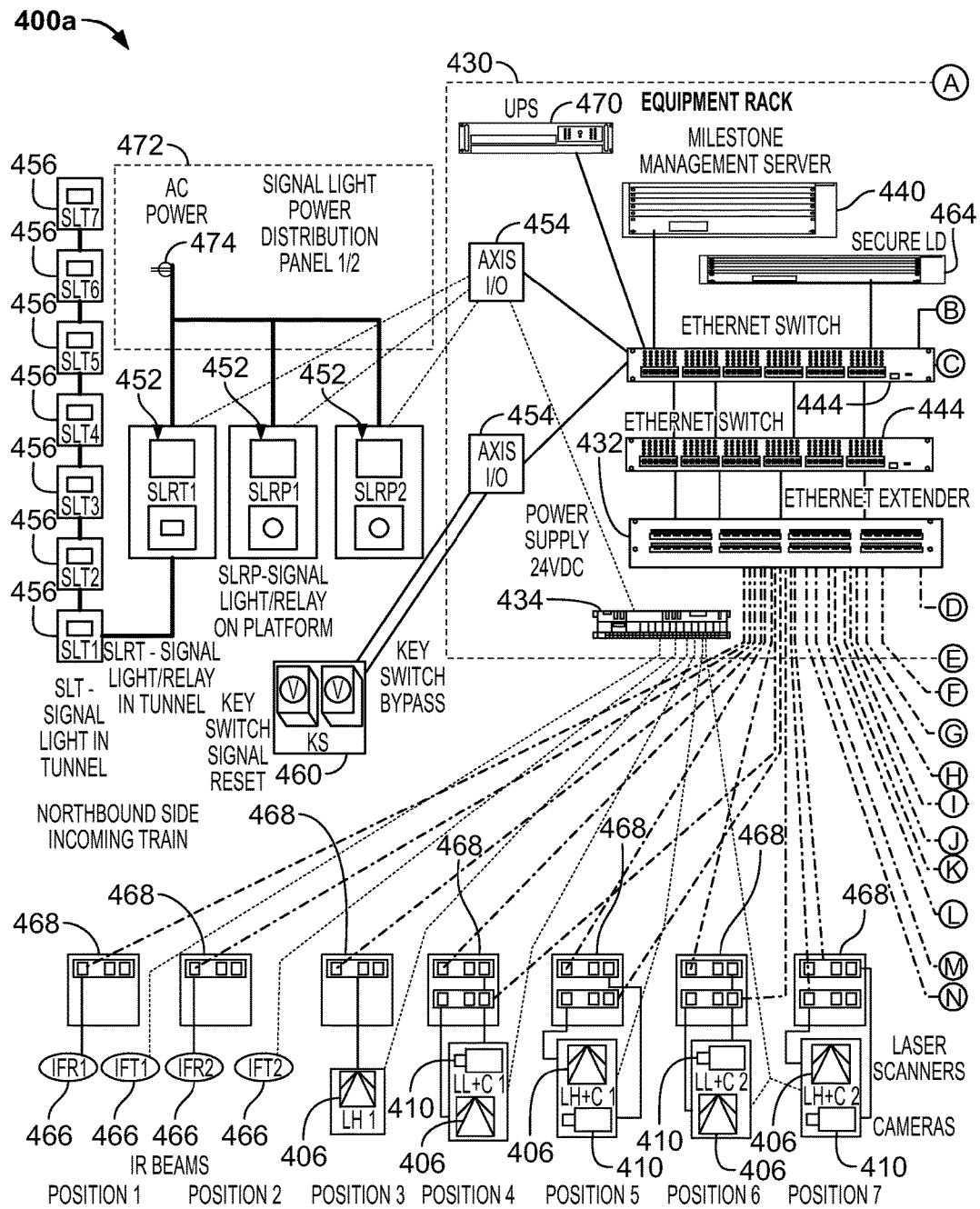
FIG. 7 depicts system-level network diagram illustrating an exemplary track intrusion detection system in accordance with embodiments of the present invention.
Figure 7:
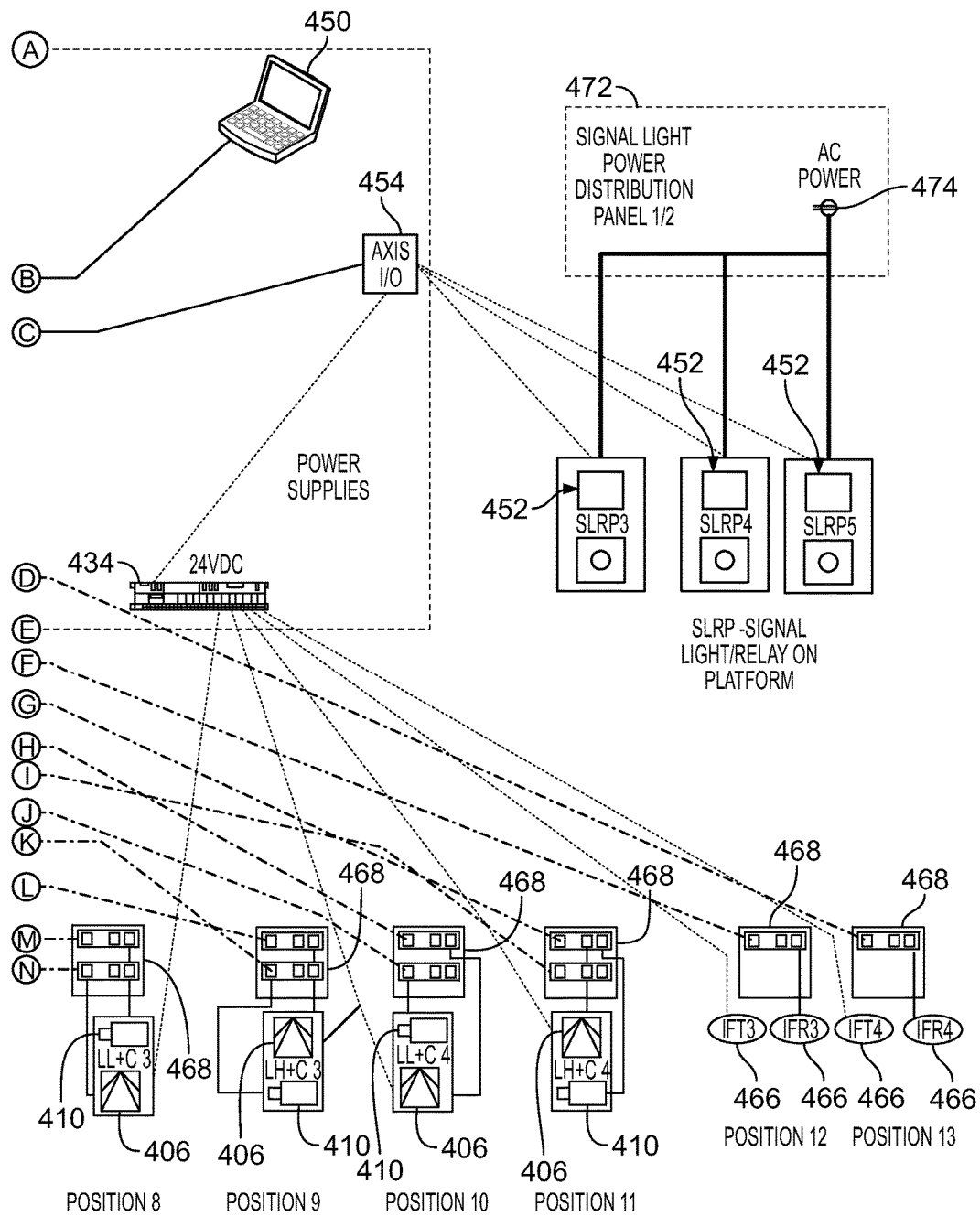

FIGS. 6 and 7 depict system-level network diagram illustrating exemplary track intrusion detection systems 400, 400a in accordance with embodiments of the present invention. The successful operation of a system 400, 400a in accordance with exemplary embodiments of the present disclosure is dependent on the existence of a robust network to provide a communication path between each of the system components. In exemplary embodiments, in addition to communication, each component may be monitored for connection status and health to provide trouble alerts in the event of problems with the system 400, 400a. These alerts may appear on a system console for a station, or the like, and command center personnel, or the like. The system 400, 400a may comprise a number of laser scanners 406 and cameras 410 in different zones comprising outbound ends and inbound ends that may be located greater than 100 m from a server, or the like. Examples of laser scanners 406 and cameras 410 are described herein.

In exemplary embodiments, a track intrusion detection system 400, 400a may comprise scanners 406 and/or cameras 410 may be communicatively coupled with a control room 430, or the like, adapted to control the components of the system 400, 400a, receive various measurements and/or indications from the system 400, 400a, and/or generate various indications, as described herein. The system 400, 400a may also comprise various networking components to communicatively couple each of the components, such as wireless networking components, Ethernet extenders 432, power supplies 434, Power over Ethernet (POE) switches, non-POE switches, management servers 442, recording servers 442, network switches 444, routers, connectivity with a Wide Area Network (WAN), client computers 450 (see FIG. 6 for a detailed description), relays 452, I/O devices 454, a signal 458 for use with the track intrusion detection system, the signal 458 adapted to be operated by the modules described with respect to FIG. 5, a platform, a key switch reset 460, a fiber patch 462, a Secure LD server 464, beams 466, platform or location servers 468, uninterruptible power supplies (UPS) 470, signal light power source distribution panels 472, signal light power sources 474, and/or the like. The design of the system 400, 400a may depend upon the placement of the laser scanners 406 and the analysis of the output data from the scanners by the servers 440, 442 and/or computers 450, or the like.

In accordance with exemplary embodiments, the scanners 406 may be adapted to create two invisible detection layers by being placed at two different heights at equidistant points opposite the platform. This provides redundant and overlapping detection zones. The servers 440, 442 may store server software to save collected data and perform analysis on the data. The server software may be adapted to then analyze the data received from the network components and activate the signal lighting 456 at the station entrance to warn any oncoming trains of an intrusion condition; produce the appropriate notification for the local and remote monitoring locations; and/or the like. The system 400, 400a may be manually disabled during track maintenance, or the like, via key switch, or the like, located on a system platform or a system console in the control room 430, or the like. Authorized transit personnel, or the like, have the responsibility and authority for the bypass operation by operating key switch, or the like. The software stored on the servers 440, 442 or a computer 450 may produce an alarm log, or the like, for local and remote train personnel, or the like. The entries in the alarm log can be acknowledged and closed as the events are handled. The entries in the alarm log can be accessed via one of the servers 440, 442 or a computer 450, and/or the like.

In order to install a system 400, 400a a main conduit from the control room 430 may be installed to each equipment position, or the like. The lasers 406 and/or cameras 410 may be pre-configured to optimal or substantially optimal configurations prior to installation, or the like. Virtual Memory System (VMS) servers and network switches 444 may also be utilized by a system 400, 400a in accordance with exemplary embodiments. Equipment racks may be installed in the control room 430, servers 440, 442, and power supplies 434 may be installed into the racks, network equipment and patch panels may be installed into the rack, connection to warning signal lighting 456 may be made. A bypass switch may be installed in specified location, a signal warning reset switch 460 may be installed in a specified location, and/or the like.

A system 400, 400a may be maintained via remote monitoring, diagnosis and remedies, or the like. A system 400, 400a may also be maintained via on-site dispatch, diagnosis, and remedy. A system 400, 400a may also comprise a monitoring device communicatively coupled with components of the system 400, 400a. The monitoring device may continuously monitor the health of the system 400, 400a to ensure its health and to look for any initial signs of degradation. Any abnormalities in the system 400, 400a may cause an instant electronic notification to the control room 430, or the like, and may activate a remote diagnostics and remedy sequence. In case the diagnostics calls for on-site services, an engineer will be dispatched accordingly.

An Ethernet extender 432 may be adapted to allow the system 400, 400a to be extended over distances suitable for embodiments of the present disclosure. Power supplies 434 may be provided to provide power to the various components of the system 400, 400a, or the like. Power over Ethernet (POE) switches, may be included to allow network cables to carry electrical power within the system 400, 400a and power certain devices within the system 400, 400a. Non-POE switches may be included in the system as well 400, 400a to connect the various components via a computer network by using packet switching, or the like. One or more management servers 442 may be included that may store the analytical software described herein and/or allow an administrator to maintain the system 400, 400a.

In exemplary embodiments, recording servers 442 may be included in the system 400, 400a to record data collected by the various components of the system 400, 400a and/or create logs for use by the management servers 442 and/or computers 4450. Networking components, such as network switches 444, routers, and connectivity with a Wide Area Network (WAN), client computers 450 (see FIG. 6 for a detailed description), relays 452, I/O devices 454, may also be included. A system 400, 400a in accordance with exemplary embodiments of the present disclosure may also comprise a signal 458. A signal 458 may be adapted for use with the track intrusion detection system 400, 400a, the signal 458 adapted to be operated by the modules described herein, a platform, and a key switch reset 460, or the like.

In exemplary embodiments, a system 400, 400a may comprise a fiber patch 462, a secure ID server 464, beams 466, platform or location servers 468, uninterruptible power supplies (UPS) 470, signal light power source distribution panels 472, and/or signal light power sources 474. A fiber patch 462 may comprise an optical fiber connector, or the like. A secure ID server 464 may be included to authenticate system users and/or provide data security for the system. Beams 466 may comprise IR beams and are generally described herein. Platform or location servers 468 may be included for each location and may be communicatively coupled to the cameras 410, scanners 406, and/or the like, and a master server 440. Signal light power sources 474 may comprise any suitable power source to run components of the system 400, 400a, such as battery, solar, AC power, and/or the like.

Figure 8:
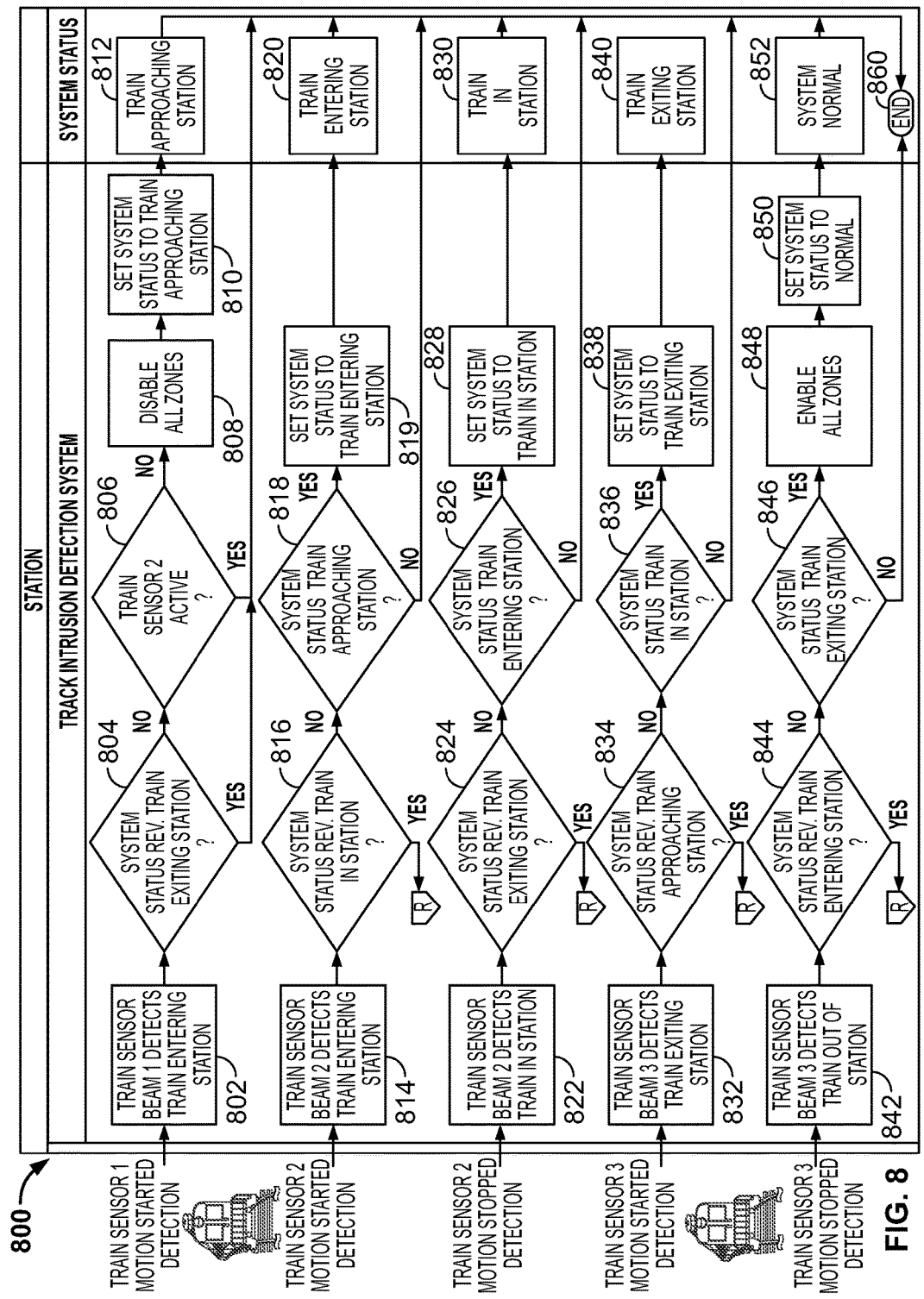
FIG. 8 depicts a flow diagram illustrating an exemplary method for intrusion detection in accordance with embodiments of the present invention.

FIG. 8 depicts a flow diagram illustrating an exemplary method 800 for intrusion detection during a normal train in station flow, in accordance with embodiments of the present invention. For ease of description, the system 100, 100a described with respect to FIG. 1 and FIG. 2 are used to illustrate an application of the methods depicted in FIG. 8, FIG. 9, and FIG. 10. In accordance with exemplary embodiments, the method may begin at step 802, where a first train sensor beam 118 detects a train. At step 804, the system determines if the train is running in reverse and exiting the station. If the train is running in reverse, the method ends at step 860. If the train is not running in reverse, the system 100, 100a determines if a second beam 120 is active at step 806. If the second beam 120 is active, the train is passing through and the method ends at step 860. If there the second beam 120 is not active and a train is not detected, the method 800 proceeds to step 808. At step 808, all detection zones may be disabled to prevent false alarms as the train is approaching the station. When the detection zones are disabled the method 800 proceeds to step 810 where the system 100, 100a sets the system status to "train approaching station" 812, which notifies users that a train is approaching station with alerts and/or messages, or the like.

In accordance with exemplary embodiments, at step 814, the second beam 120 is checked to determine if a train is entering the station. At step 816, the system 100, 100a determines if the train is running in reverse. If the train is running in reverse, the system status will be "reverse train in station" and the method 800 will proceed to step R, shown in FIG. 9. If the system 100, 100a is not in "reverse train in station" mode, the system determines if the status is "train approaching station" 812 (See Steps 802-810). At step 818, if the status is "train approaching station" 812 and the second beam 120 is active, the system 100, 100a may set the system status to "train entering station" 820 at step 819, meaning that the system 100, 100a has determined that the train is now entering the station. At step 818, if the status is not "train approaching station"812 and the second beam 120 is active, the method 800 ends at step 860. In some embodiments, the beams 118, 120, 122, 124 may be positioned at suitable distances outside the zones to be monitored (e.g., the station, U-1-U16, and/or L-1-L-16). For example, the beams 118, 120, 122, 124 may be positioned 25', 50', 75', 100', or the like outside the zones to be monitored.

In accordance with exemplary embodiments, at step 822, the second beam 120 is checked to determine if a train is in the station. At step 824, the system 100, 100a determines if the train is running in reverse and exiting the station. If the train is running in reverse and exiting the station, the system status will be "reverse train exiting station" and the method 800 will proceed to step R, shown in FIG. 9. If the system 100, 100a is not in "reverse train exiting station" mode, the system 100, 100a determines if the status is "train entering station" 820 (See Steps 814-819). At step 826, if the status is "train entering station" 820 and the second beam 120 is active and determines the train is in the station, the system 100, 100a may proceed to step 828 and set the system status to "train in station" 830, meaning that the system 100, 100a has determined that the train is now in the station. At step 826, if the status is not "train entering station"820 and the second beam 120 is active, the method 800 ends at step 860.

In accordance with exemplary embodiments, at step 832, the third beam 122 is checked to determine if a train is exiting the station. At step 834, the system 100, 100a determines if the train is running in reverse and approaching the station. If the train is running in reverse and approaching the station, the system status will be "reverse train approaching station" and the method 800 will proceed to step R, shown in FIG. 9. If the system 100, 100a is not in "reverse train approaching station" mode, the system 100, 100a determines if the status is "train in station" 830 (See Steps 822-828). At step 836, if the status is "train in station" 830 and the third beam 122 is active, the system 100, 100a may proceed to step 838 and set the system status to "train exiting station" 840, meaning that the system 100, 100a has determined that the train is now exiting the station. At step 836, if the status is not "train in station"830 and the second beam 120 is active, the method 800 ends at step 860.

In accordance with exemplary embodiments, at step 842, the third beam 122 is checked to determine if a train is out of the station. At step 844, the system 100, 100a determines if the train is running in reverse and entering the station. If the train is running in reverse and entering the station, the system status will be "reverse train entering station" and the method 800 will proceed to step R, shown in FIG. 9. If the system 100, 100a is not in "reverse train entering station" mode, the system 100, 100a determines if the status is "train exiting station" 840 (See Steps 832-838). At step 846, if the status is "train exiting station" 840 and the third beam 122 is active, the system 100, 100a may proceed to step 848 and enable all detection zones and then 850 and set the system status to "normal" 852, meaning that the system 100, 100a has determined that there are no trains present in the station or approaching or exiting the station. At step 846, if the status is not "train exiting station"840 and the second beam 120 is active, the method 800 ends at step 860. After the system status is set to system normal 852 at step 850, the method may end at step 860. Each of the steps of the method 800 are depicted for ease of reference in the flow chart but they may be performed in alternative orders, simultaneously, or in a loop, or the like.

Figure 9:
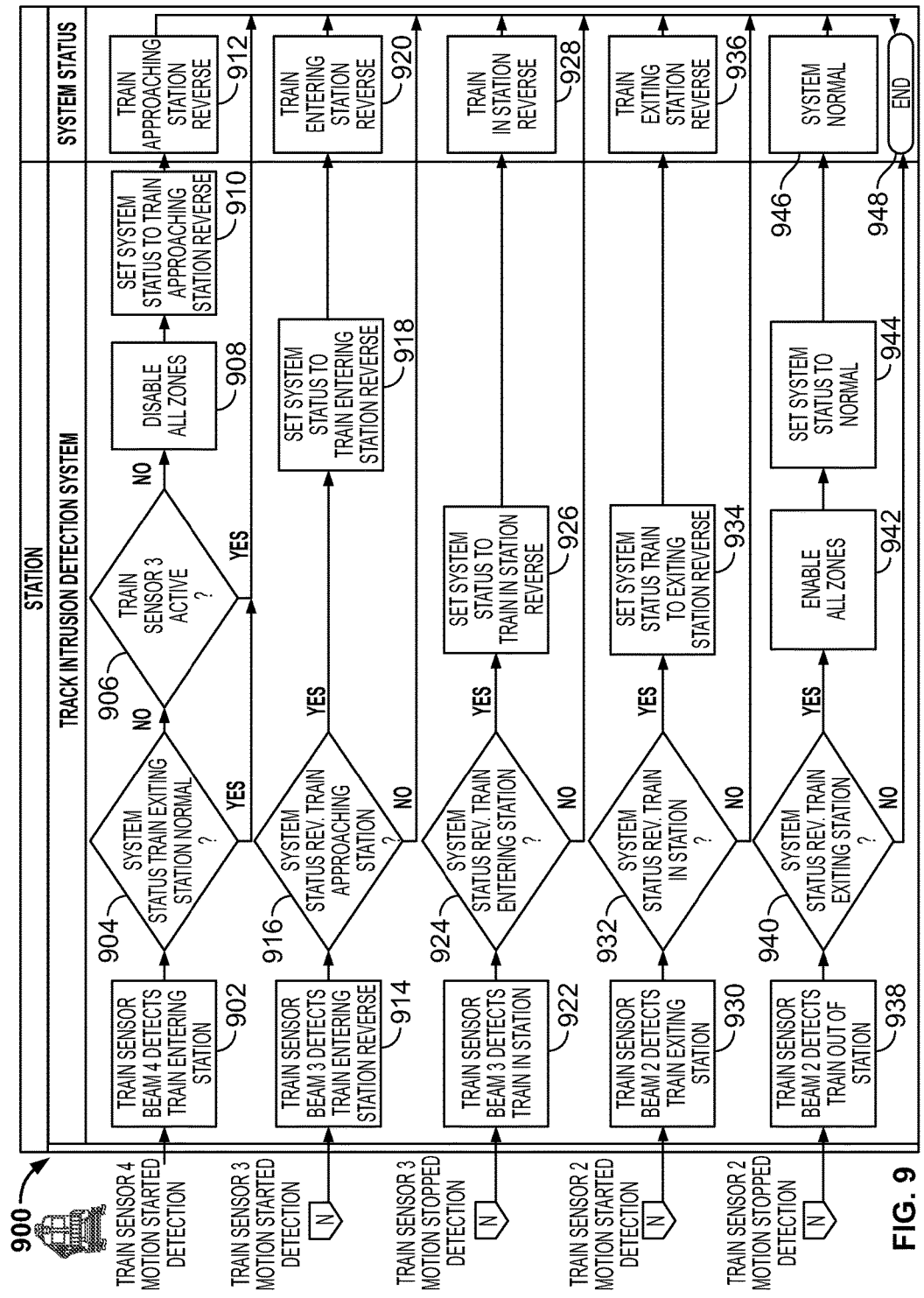
FIG. 9 depicts a flow diagram illustrating an exemplary method for intrusion detection in accordance with embodiments of the present invention.

FIG. 9 depicts a flow diagram illustrating an exemplary method 900 for intrusion detection during a reverse train in station flow, in accordance with embodiments of the present invention. For ease of description, the system 100, 100a described with respect to FIG. 1 and FIG. 2 are used to illustrate an application of the methods depicted in FIG. 9. In accordance with exemplary embodiments, the method may begin at step 902, where a fourth train sensor beam 124 detects a train. At step 904, the system 100, 100a determines if the train is running in a normal (forward) direction and exiting the station. If the train is running normal (forward), the method ends at step 948. If the train is not running forward, the system 100, 100a determines if the third beam 122 is active at step 906. If the third beam 122 is active, the train is passing through and the method ends at step 960. If there the third beam 122 is not active and a train is not detected, the method 900 proceeds to step 908. At step 908, all detection zones may be disabled to prevent false alarms as the train is approaching the station in reverse. When the detection zones are disabled, the method 900 proceeds to step 910 where the system 100, 100a sets the system status to "train approaching station reverse" 912, which notifies users that a train is approaching station in reverse with alerts and/or messages, or the like.

In accordance with exemplary embodiments, at step 914, the third beam 122 is checked to determine if a train is entering the station in reverse. At step 916, the system 100, 100a determines if the train is running in reverse and approaching the station and the status is "train approaching station reverse" 912. If the status is "train approaching station reverse" 912 and the third beam 122 is active, the system status is set to "train entering station in reverse" 920 at step 918. If the system 100, 100a is not in "train approaching station in reverse" 912, the method ends at step 948.

In accordance with exemplary embodiments, at step 922, the third beam 122 is checked to determine if a train is in the station. At step 924, the system 100, 100a determines if the train is running in reverse and entering the station and the status is "train entering station reverse" 920. If the status is "train entering station reverse" 920 and the third beam 122 is active and determines the train is in the station, the system status is set to "train in station reverse" 928 at step 926. If the system 100, 100a is not in "train entering station in reverse" 920, the method ends at step 948.

In accordance with exemplary embodiments, at step 930, the second beam 120 is checked to determine if a train is exiting the station. At step 932, the system 100, 100a determines if the train is running in reverse and in the station and the status is "train in station reverse" 928. If the status is "train in station reverse" 928 and the second beam 120 is active, the system status is set to "train exiting station reverse" 936 at step 934. If the system 100, 100a is not in "train in station in reverse" 928, the method ends at step 948.

In accordance with exemplary embodiments, at step 938, the second beam 120 is checked to determine if a train is out of the station. At step 940, the system 100, 100a determines if the train is running in reverse and exiting the station. If the train is running in reverse and exiting the station, the system status is "train exiting station reverse" 936, and the second beam 120 is active, the system 100, 100a may proceed to step 942 and enable all detection zones and then 944 and set the system status to "normal" 946, meaning that the system 100, 100a has determined that there are no trains present in the station or approaching or exiting the station. At step 940, if the status is not "train exiting station reverse" 936 and the second beam 120 is active, the method 900 ends at step 960. After the system status is set to system normal 946 at step 944, the method may end at step 948. Each of the steps of the method 900 are depicted for ease of reference in a certain order in the flow chart, but they may be performed in alternative orders, simultaneously, or in a loop, or the like.

Figure 10:
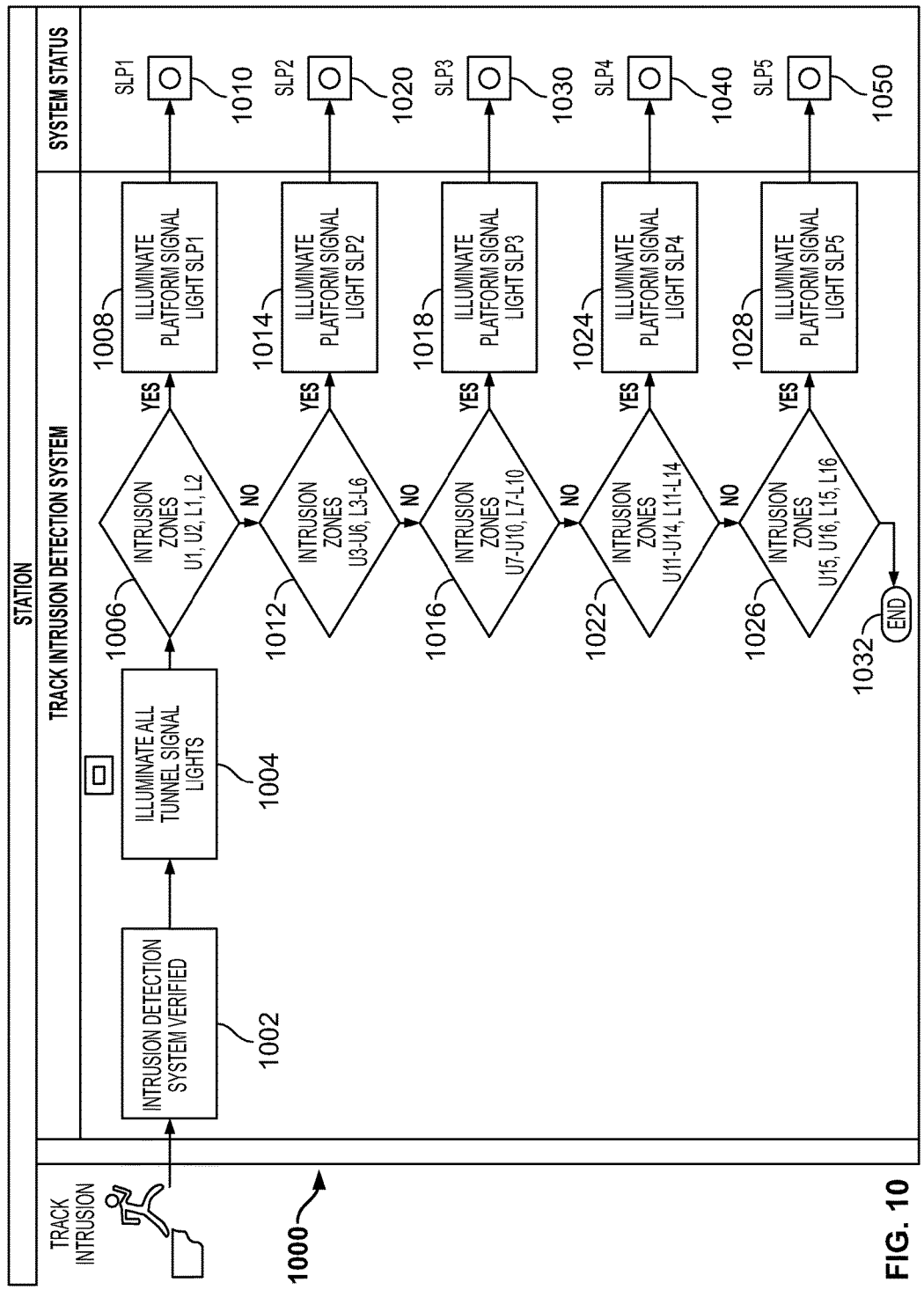
FIG. 10 depicts a flow diagram illustrating an exemplary method for intrusion detection in accordance with embodiments of the present invention.

FIG. 10 depicts a flow diagram illustrating an exemplary method 1000 for intrusion detection in accordance with embodiments of the present invention. For ease of description, the system 100, 100a described with respect to FIG. 1 and FIG. 2 are used to illustrate an application of the methods depicted in FIG. 10. The method begins at step 1002, where a track intrusion is detected and verified by the system 100, 100a. When a track intrusion is detected and verified at step 1002, the method proceeds to step 1004 wherein all tunnel signal lights 128 are illuminated. The location of the intrusion is then determined in steps 1006, 1012, 1016, 1022, 1026 (e.g. U1-U16; L1-L-16) and the corresponding platform signal lights 1010, 1020, 1030, 1040, and 1050, respectively, (depicted as platform signal lights 126 in FIG. 1 and FIG. 2) corresponding to those sections are activated and illuminated in corresponding steps 1008, 1014, 1018, 1024, 1028, respectively, or the like. After the appropriate intrusion zones are determined and the corresponding signal lights are illuminated, the method ends at step 1032. The lights may then be deactivated by a manual override, an automatic override, after the intrusion is removed, and/or after a set time, or the like.

Figure 11:
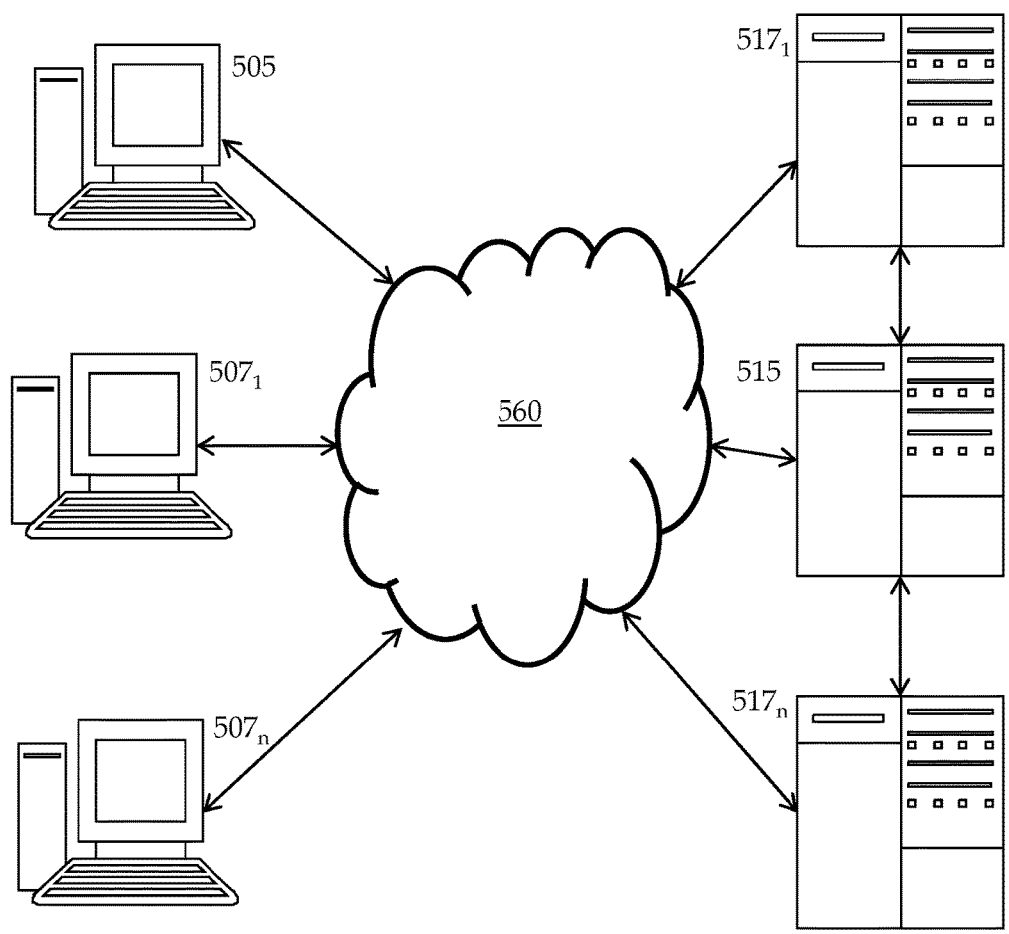
FIG. 11 depicts a system-level network diagram of a portion of a track intrusion detection system in accordance with embodiments of the present invention.

FIG. 11 depicts a system-level network diagram of a portion of a track intrusion detection system 500 in accordance with embodiments of the present invention. The system 500 generally comprises at least a first client 505 and secondary clients $507_1$ and $507n$, each in communication with an administrator, generally hosting a central server 515, through a network 560. Methods in accordance with one or more embodiments of the present invention take place over the network 560, which may comprise a global computer network, for example, the Internet. The clients 505, 507 may represent devices connected to the system 400, 400a described with respect to FIG. 4.

Although FIG. 11 explicitly depicts three clients $507_1$, $507_2$, and $507_n$, it should be appreciated that "n" represents any number of clients feasible in accordance with embodiments of the present invention. For ease of reference, as used herein, each of the terms "second user" or "secondary user" may refer to any one or all of the clients $507_1$, $507_2$, and $507_n$ within the system 500. Likewise, although FIG. 5 explicitly depicts only one first client 505, there may be more than one first client 505 in accordance with certain embodiments of the present invention. That is, in certain embodiments, multiple users may perform the same or similar functions as the first client 505. As understood by embodiments of the present invention, a user may include any entity capable of participating in the system and methods disclosed herein.

The first client 505 may generally comprise an authorized transit user computer, or the like. Secondary clients 507 may generally comprise additional authorized transit user computers with different security access than the first client 505, or the like. In a basic exemplary embodiment, within the system 500, the first client 505, and/or any of the secondary clients 507, may be capable of transmitting data to and from an administrator using a communication device. The communication device in the context of the present application may include, but is not limited to, a personal computer, a portable computer, a handheld computer, a cellular phone, a smart phone, a tablet computer, a laptop computer, an Internet appliance, a smartphone, a mobile communications device, a Personal Data Assistant (PDA) or the like, or may generally include a computer, as discussed below with respect to FIG. 6.

The administrator generally may access a server 515, which may further host an accessible data portal. In alternative embodiments, the server 515 may be located on a third party location (e.g., a server farm, or cloud), or at the same location as the first client 505, or any one or more of the secondary clients 507. The accessible data portal, which may be accessible to the first client 505 and any of the secondary clients 507, may communicate with each user through the network 560. The accessible data portal may comprise any number of security measures to provide a reasonably secure system, suitable for embodiments of the present invention. The accessible data portal may further comprise a graphical user interface (GUI) through which any of the first client 505 or secondary clients 507 may access the server 515.

Methods in accordance with embodiments of the present invention may take place over the network 560, which may comprise a global computer network, for example, the internet. The communications functions described herein can be accomplished using any kind of wired and/or wireless computing network or communications means capable of transmitting data or signals, such as a wireless and/or wired computing network allowing communication via, for example, an 802.11 ("Wi-Fi") protocol, cellular data protocol (e.g., EDGE, CDMA, TDMA, GSM, LTE), and/or the like. Suitable examples include a packet-switched network, a local area network (LAN), wide area network (WAN), virtual private network (VPN), or any other means of transferring data. The network 560 may be a partial or full deployment of most any communication/computer network or link, including any of, any multiple of, any combination of or any combination of multiples of a public or private, terrestrial wireless or satellite, and wireline networks or links. A single network 560 or multiple networks (not shown) that are communicatively coupled to one another can be used. It is contemplated that multiple networks of varying types can be connected together and utilized to facilitate the communications contemplated by the systems and elements described in this disclosure.

For ease of reference, as used herein, the term "client" may refer to any one or all of the clients, 505, 507$_1$, and 507$_n$ within the system 500. That is, in certain embodiments, multiple clients may perform the same or similar functions. For ease, one client 505 will be referred to herein, however, in exemplary embodiments, more than one client 505 may be included in the system 500.

As used herein, the term "computer" may generally refer to any device that is capable of processing a signal or other information. A computer may include software in the form of programmable code, micro code, and or firmware or other hardware embedded logic and may include multiple processors which operate in parallel. The processing performed by a computer may be distributed among multiple separate devices, and the term computer encompasses all such devices when configured to perform in accordance with the disclosed embodiments.

The client 505 may generally comprise a communications device, such as a computer. In a basic exemplary embodiment, within the system 500, the client 505 may be capable of transmitting data to and from a host server 515. The host server 515 may host an accessible data portal (e.g., a website or the like). The accessible data portal, which may be accessible to the client 505, may communicate with the client 505 through the network 560. The accessible data portal may comprise any number of security measures to provide a reasonably secure system, suitable for embodiments of the present disclosure.

The system may also comprise secondary servers 517$_1$ and 517$_n$. Although two secondary servers 517$_1$ and 517$_n$ are depicted in FIG. 1, it should be appreciated that "n" represents any number of servers suitable for use with embodiments of the present disclosure. For ease of reference, as used herein, the term "server" may refer to any one or all of the servers, 515, 517$_1$, and 517$_n$ within the system 500. That is, in certain embodiments, multiple servers may perform the same or similar functions.

The server 515 may also comprise a database or other sortable data storage memory to enable the system and methods disclosed herein. In many embodiments, the database may be any commercially available data storage database suitable for embodiments of the present disclosure. For example, in one embodiment, the database comprises at least one or more database management systems, such as any of an Oracle, DB2, Microsoft Access, Microsoft SQL Server, Postgres, MySQL, 4th Dimension, FileMaker, Alpha Five Database Management System, or the like. Often contained within the database is a plurality of data sets, each comprising specific data. A first data set may correlate to a first client 505, wherein a plurality of client-specific data is stored. The database may also include any number of subsequent data sets representing N clients, wherein N represents any number of clients practical for operation of embodiments of the present disclosure. In accordance with one embodiment of the present disclosure, any of the servers or clients may comprise a computer, for example, as shown in the form of a computer 210 depicted in FIG. 6.

In some embodiments of the present disclosure, a number of servers 515 may be present at each station in a transit system, or the like. In some embodiments, a master server may be included that may control, monitor, administer, oversee, or the like a number of servers at various locations and separate data by station, by city, by state, and/or the like. In some embodiments, the servers 515 may comprise a central repository for data collected and/or stored by the system 500, or the like. The server 515 may store logs, video recordings, or the like, or other data that may be required by the system 500, or the like. In some embodiments, the data may be stored for a selected or preconfigured time. For example, the data may be retained for 6 months, 1 year, 2, years, 5, years, 10 years, any suitable time period, or the like. In some embodiments the central server may provide the user or an administrator with a status of each station, or the like, via a display.

As appreciated by embodiments of the present invention, more practical devices, such as mobile devices, mobile telephones, or the like, are likely to be utilized than a computer for embodiments of the present invention. However, it is also appreciated there is a significant similarity in core components between a mobile device and a computer. The following components are described for exemplary purposes only, and each component's mobile equivalent is also contemplated within embodiments of the present invention.

Figure 12:
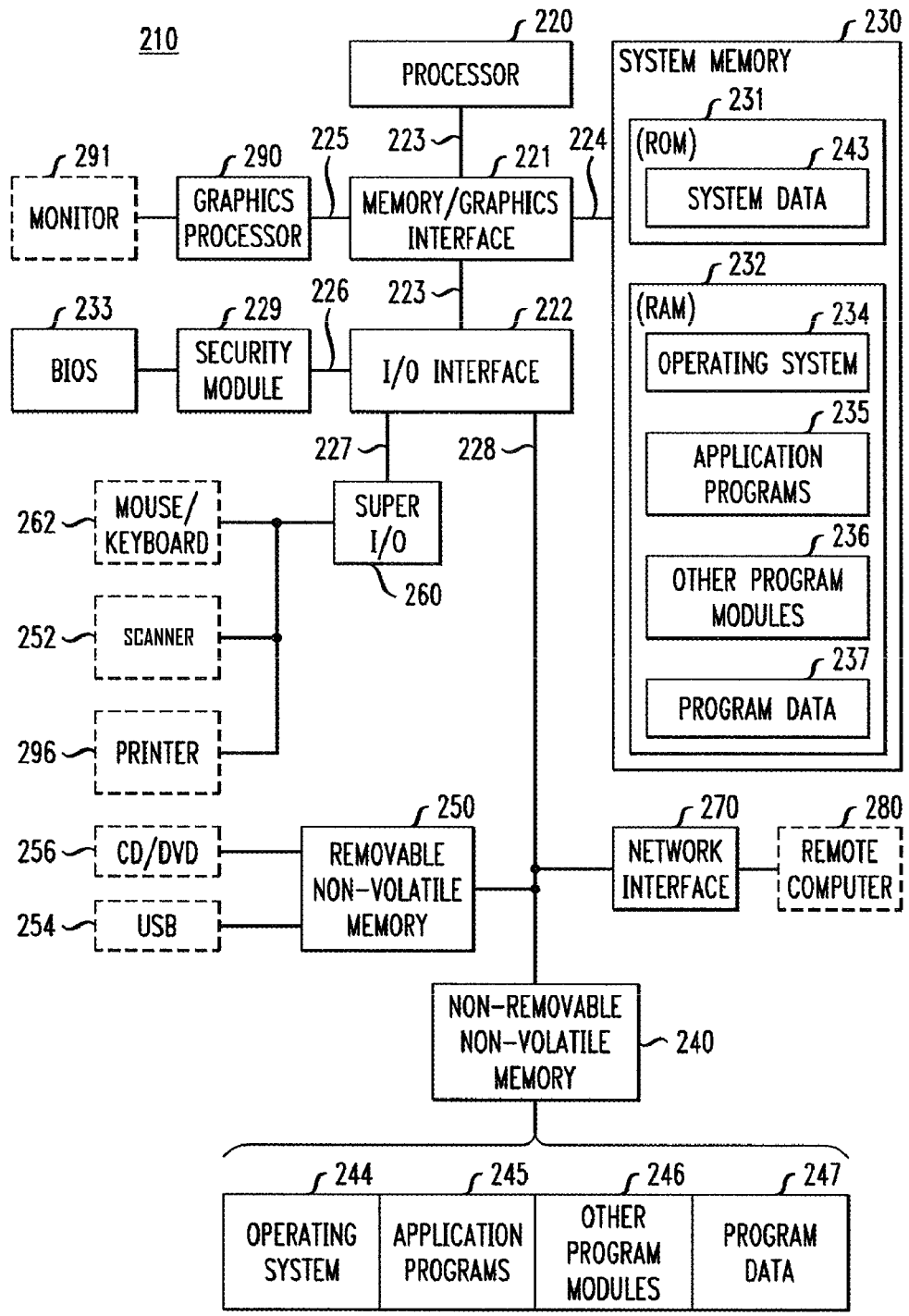
FIG. 12 depicts a block diagram of a computer system, which is capable of being used in connection with the system depicted in FIG. 11, in accordance with embodiments of the present invention.

FIG. 12 depicts a block diagram of a computer system 210, which is capable of being used in connection with the system depicted in FIG. 11, in accordance with embodiments of the present invention. As appreciated by embodiments of the present disclosure, mobile devices, such as mobile telephones, tablets, netbooks, or the like, may be utilized instead a computer 210 for embodiments of the present disclosure. However, it is also appreciated there is a significant similarity in core components between a mobile device and a computer 210. The following components are described for exemplary purposes only, and each component's mobile equivalent is also contemplated within embodiments of the present disclosure.

Components shown in dashed outline are not part of the computer 210, but are used to illustrate the exemplary embodiment of FIG. 6. Components of computer 210 may include, but are not limited to, a processor 620, a system memory 230, a memory/graphics interface 221, also known as a Northbridge chip, and an I/O interface 222, also known as a Southbridge chip. The system memory 230 and a graphics processor 290 may be coupled to the memory/graphics interface 221. A monitor 291 or other graphic output device may be coupled to the graphics processor 290.

A series of system busses may couple various system components including a high speed system bus 223 between the processor 220, the memory/graphics interface 221 and the I/O interface 222, a front-side bus 224 between the memory/graphics interface 221 and the system memory 230, and an advanced graphics processing (AGP) bus 225 between the memory/graphics interface 221 and the graphics processor 290. The system bus 223 may be any of several types of bus structures including, by way of example, and not limitation, such architectures include Industry Standard Architecture (ISA) bus, Micro Channel Architecture (MCA) bus and Enhanced ISA (EISA) bus. As system architectures evolve, other bus architectures and chip sets may be used but often generally follow this pattern. For example, companies such as Intel and AMD support the Intel Hub Architecture (IHA) and the Hypertransport architecture, respectively.

The computer 210 typically includes a variety of computer readable media. Computer readable media can be any available media that can be accessed by computer 210 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media may include, but is not limited to, RAM, ROM, EPROM, flash memory or other memory technology, CD-ROM, digital versatile disks (DVD), blue-ray or other optical disk storage, magnetic cassettes, magnetic tape, magnetic disk storage or other magnetic storage devices, or any other medium which can be used to store the desired information and which can be accessed by computer 210. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

The system memory 230 includes computer storage media in the form of volatile and/or nonvolatile memory such as read only memory (ROM) 231 and random access memory (RAM) 232. The system ROM 231 may contain permanent system data 243, such as identification information. In some embodiments, a basic input/output system (BIOS) may also be stored in system ROM 231. RAM 232 typically contains data and/or program modules that are immediately accessible to and/or presently being operated on by processor 220. By way of example, and not limitation, FIG. 2 illustrates operating system 234, application programs 235, other program modules 236, and program data 237.

The I/O interface 222 may couple the system bus 223 with a number of other busses 226, 227 and 228 that couple a variety of internal and external devices to the computer 210. A serial peripheral interface (SPI) bus 226 may connect to a basic input/output system (BIOS) memory 233 containing the basic routines that help to transfer information between elements within computer 210, such as during start-up. In some embodiments, a security module 229 may be incorporated to manage metering, billing, and enforcement of policies. The security module 229 may comprise any security technology suitable for embodiments disclosed herein.

A super input/output chip 260 may be used to connect to a number of peripherals, such as a scanner 252, keyboard/mouse 262, and printer 296, as examples. The super I/O chip 260 may be connected to the I/O interface 222 with a low pin count (LPC) bus, in some embodiments. The super I/O chip 260 is widely available in the commercial marketplace. In one embodiment, bus 228 may be a Peripheral Component Interconnect (PCI) bus, or a variation thereof, may be used to connect higher speed peripherals to the I/O interface 222. A PCI bus may also be known as a Mezzanine bus. Variations of the PCI bus include the Peripheral Component Interconnect-Express (PCI-E) and the Peripheral Component Interconnect-Extended (PCI-X) busses, the former having a serial interface and the latter being a backward compatible parallel interface. In other embodiments, bus 228 may be an advanced technology attachment (ATA) bus, in the form of a serial ATA bus (SATA) or parallel ATA (PATA).

The computer 210 may also include other removable/non-removable, volatile/nonvolatile computer storage media. By way of example only, FIG. 2 illustrates a hard disk drive 240 that reads from or writes to non-removable, nonvolatile magnetic media. Removable media, such as a universal serial bus (USB) memory 254 or CD/DVD drive 256 may be connected to the PCI bus 228 directly or through an interface 250. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like.

The drives and their associated computer storage media discussed above and illustrated in FIG. 6, provide storage of computer readable instructions, data structures, program modules and other data for the computer 210. In FIG. 6, for example, hard disk drive 240 is illustrated as storing operating system 244, application programs 245, other program modules 246, and program data 247. Note that these components can either be the same as or different from operating system 234, application programs 235, other program modules 236, and program data 237. Operating system 244, application programs 245, other program modules 246, and program data 247 are given different numbers here to illustrate that, at a minimum, they are different copies. A client may enter commands and information into the computer 210 through input devices such as a mouse/keyboard 262 or other input device combination. Other input devices (not shown) may include a microphone, joystick, game pad, satellite dish, scanner, or the like. These and other input devices are often connected to the processor 220 through one of the I/O interface busses, such as the SPI 226, the LPC 227, or the PCI 228, but other busses may be used. In some embodiments, other devices may be coupled to parallel ports, infrared interfaces, game ports, and the like (not depicted), via the super I/O chip 260.

The computer 210 may operate in a networked environment using logical connections to one or more remote computers, such as a remote computer 280 via a network interface controller (NIC) 270. The remote computer 280 may be a personal computer, a server, a router, a network PC, a peer device or other common network node, and typically includes many or all of the elements described above relative to the computer 210. The logical connection between the NIC 270 and the remote computer 280 depicted in FIG. 6 may include a local area network (LAN), a wide area network (WAN), or both, but may also include other networks. Such networking environments are commonplace in offices, enterprise-wide computer networks, intranets, and the Internet. In some embodiments, the network interface may use a modem (not depicted) when a broadband connection is not available or is not used. It will be appreciated that the network connection shown is exemplary and other means of establishing a communications link between the computers may be used.

Although the computer 210 of FIG. 6 is described as an exemplary computing device for various applications of embodiments of the present invention, it should be appreciated, a multitude of similar computing devices exist and are equally suitable for embodiments of the present disclosure. It is further understood by embodiments of the present disclosure, a computing device may comprise all of the elements disclosed in FIG. 6, or any combination of one or more of such elements, in order to perform the necessary functions of the embodiments of the present disclosure.

It is understood by embodiments of the present disclosure that a computer, such as the one depicted in FIG. 6, may be connected to a computer network or system. A computer network may include the Internet, a global computer network, an internal computer network, dedicated server networks, or the like.

While the foregoing is directed to embodiments of the present invention, other and further embodiments of the invention may be devised without departing from the basic scope thereof. It is also understood that various embodiments described herein may be utilized in combination with any other embodiment described, without departing from the scope contained herein. In addition, embodiments of the present invention are further scalable to allow for additional components, as particular applications may require.

What is claimed is:

1. A track intrusion detection system for detecting the presence of an object in a path of a vehicle, the system comprising:
a plurality of upper scanners positioned in elevated positions above the path of the vehicle, each upper scanner adapted to create a first detection layer;
a plurality of lower scanners adapted to create a second detection layer, each second detection layer overlapping the first detection layer, the lower scanner positioned at a lower height, the lower height closer to a ground surface than the upper scanner, the plurality of upper scanners and the plurality of lower scanners placed at predetermined horizontal intervals of a platform along the path of the vehicle, thereby creating overlapping detection zones along the platform;
signal lighting for producing a visual signal, the signal lighting positioned to warn an oncoming vehicle of the presence of the object in the path of the vehicle;
at least one server in communication with the lower scanner, the upper scanner, and the signal lighting, the server comprising:
one or more processors; and
memory;
wherein the at least one server is adapted analyze data received from the upper scanner and the lower scanner to determine if an object is in the path of the vehicle;
wherein the at least one server is adapted to activate the signal lighting when the server determines that an object is in the path of the vehicle; and
wherein the upper scanner is positioned at an angle with a detection layer target below a platform, the platform positioned adjacent the path of the vehicle and wherein the lower scanner is positioned at an angle with a target substantially directly across a set of tracks below the platform.

2. The system of claim 1, wherein the upper scanner and the lower scanner comprise a laser scanner or an infrared beam device adapted to detect the size, speed and distance of an object within the first detection layer or the second detection layer.

3. The system of claim 2, wherein the infrared beam comprises a four channel photo beam.

4. The system of claim 1, further comprising a verification camera positioned adjacent the path, the verification camera for providing visual verification of path conditions.

5. The system of claim 4, wherein the camera is adapted to provide an optical view or a thermal view.

6. The system of claim 1, wherein the upper scanner is positioned 8 feet above the path at an angle with a detection layer target 6 inches below a platform, the platform positioned adjacent the path; and
wherein the lower scanner is positioned 2 feet above the path with a target substantially directly across a set of tracks below the platform.

7. The system of claim 1, wherein the vehicle comprises a train and the object is at least one of a person, animal, vehicle, or a piece of debris.

8. The system of claim 1, wherein the at least one server is adapted to notify transit personnel via electronic message the server determines that an object is in the path of the vehicle.

9. The system of claim 1, wherein the at least one server is adapted to take one or more corrective safety measures if the server determines that an object is in the path of the vehicle.

10. The system of claim 9, wherein the one or more corrective safety measures comprises activating a brake system of the vehicle.

11. The system of claim 1, wherein the at least one server will only activate the signal lighting when the server determines that an object is in the path of the vehicle and the object is greater than 12 inches in width or height and is not another train.

12. The system of claim 1, wherein the at least one server will not activate the signal lighting when the system is manually disabled via a secured switch or a key switch.

13. The system of claim 1, wherein the upper scanner and the lower scanner are positioned at points substantially equidistant from a platform positioned adjacent to the path of the vehicle.

14. The system of claim 1, wherein an upper scanner and lower scanner are disposed along a common axis, and the first detection layer of the upper scanner intersects with the second detection layer of the lower scanner at a location horizontally spaced from the axis of the upper and lower scanners.

15. A track intrusion detection system for detecting the presence of an object in a path of a vehicle, the system comprising:
   a plurality of upper scanners positioned in elevated positions above the path of the vehicle, each upper scanner adapted to create a first detection layer;
   a plurality of lower scanners adapted to create a second detection layer, each second detection layer overlapping the first detection layer, the lower scanner positioned at a lower height, the lower height closer to a ground surface than the upper scanner, the plurality of upper scanners and the plurality of lower scanners placed at predetermined horizontal intervals of a platform along the path of the vehicle, thereby creating overlapping detection zones along the platform;
   signal lighting for producing a visual signal, the signal lighting positioned to warn an oncoming vehicle of the presence of the object in the path of the vehicle;
   a verification camera positioned adjacent the path, the verification camera for providing visual verification of path conditions
   at least one server in communication with the lower scanner, the upper scanner, and the signal lighting, the server comprising:
      one or more processors; and
      memory;
   wherein the at least one server is adapted analyze data received from the upper scanner and the lower scanner to determine if an object is in the path of the vehicle;
   wherein the at least one server is adapted to activate the signal lighting when the server determines that an object is in the path of the vehicle;
   wherein the upper scanner and the lower scanner comprise a laser scanner or an infrared beam device adapted to detect the size, speed and distance of an object within the first detection layer or the second detection layer; and
   wherein the upper scanner is positioned at an angle with a detection layer target below a platform, the platform positioned adjacent the path of the vehicle and wherein the lower scanner is positioned at an angle with a target substantially directly across a set of tracks below the platform.

16. The system of claim 15, wherein the upper scanner is positioned 8 feet above the path at an angle with a detection layer target 6 inches below a platform, the platform positioned adjacent the path; and
   wherein the lower scanner is positioned 2 feet above the path with a target substantially directly across a set of tracks below the platform.

17. A track intrusion detection system for detecting the presence of an object in a path of a vehicle, the system comprising:
   a plurality of upper scanners positioned in elevated positions above the path of the vehicle, each upper scanner adapted to create a first detection layer;
   a plurality of lower scanners adapted to create a second detection layer, each second detection layer overlapping the first detection layer, the lower scanner positioned at a lower height, the lower height closer to a ground surface than the upper scanner, the plurality of upper scanners and the plurality of lower scanners placed at predetermined horizontal intervals of a platform along the path of the vehicle, thereby creating overlapping detection zones along the platform;
   signal lighting for producing a visual signal, the signal lighting positioned to warn an oncoming vehicle of the presence of the object in the path of the vehicle;
   at least one server in communication with the lower scanner, the upper scanner, and the signal lighting, the server comprising:
      one or more processors; and
      memory;
   wherein the at least one server is adapted analyze data received from the upper scanner and the lower scanner to determine if an object is in the path of the vehicle;
   wherein the at least one server is adapted to activate the signal lighting when the server determines that an object is in the path of the vehicle;
   wherein the at least one server will not activate the signal lighting when the system is manually disabled via a secured switch or a key switch;
   wherein the at least one server is adapted to notify transit personnel via electronic message if the server determines that an object is in the path of the vehicle; and
   wherein the upper scanner is positioned at an angle with a detection layer target below a platform, the platform positioned adjacent the path of the vehicle and wherein the lower scanner is positioned at an angle with a target substantially directly across a set of tracks below the platform.

18. The system of claim 17, wherein the upper scanner is positioned 8 feet above the path at an angle with a detection layer target 6 inches below a platform, the platform positioned adjacent the path; and
   wherein the lower scanner is positioned 2 feet above the path with a target substantially directly across a set of tracks below the platform.

* * * * *